US007682064B2

(12) United States Patent
Lee

(10) Patent No.: US 7,682,064 B2
(45) Date of Patent: Mar. 23, 2010

(54) BACKLIGHT ASSEMBLY AND DISPLAY APPARATUS HAVING THE SAME

(75) Inventor: Seung-Je Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/347,132

(22) Filed: Feb. 3, 2006

(65) Prior Publication Data
US 2006/0171170 A1 Aug. 3, 2006

(30) Foreign Application Priority Data
Feb. 3, 2005 (KR) .................... 10-2005-0010085

(51) Int. Cl.
*F21V 7/04* (2006.01)
(52) U.S. Cl. .................. 362/632; 362/633; 362/634; 362/581; 362/396; 362/457
(58) Field of Classification Search ............. 362/632, 362/610, 633, 634, 581, 396, 457
See application file for complete search history.

(56) References Cited

U.S. PATENT DOCUMENTS

| 5,211,464 | A | * | 5/1993 | Bohmer | 362/634 |
|---|---|---|---|---|---|
| 5,497,293 | A | * | 3/1996 | Noguchi et al. | 362/609 |
| 6,163,350 | A | * | 12/2000 | Ihara | 349/58 |
| 6,587,166 | B1 | * | 7/2003 | Lee et al. | 349/58 |
| 6,609,808 | B2 | * | 8/2003 | Chen | 362/632 |
| 6,667,779 | B2 | * | 12/2003 | Lee | 349/58 |
| 7,207,707 | B2 | * | 4/2007 | Huang et al. | 362/614 |
| 2002/0171784 | A1 | * | 11/2002 | Choi et al. | 349/58 |
| 2003/0117793 | A1 | * | 6/2003 | Shin et al. | 362/31 |
| 2003/0223020 | A1 | * | 12/2003 | Lee | 349/58 |
| 2004/0257795 | A1 | * | 12/2004 | Yamamoto et al. | 362/31 |
| 2005/0007793 | A1 | * | 1/2005 | Yoshida et al. | 362/558 |
| 2005/0063172 | A1 | * | 3/2005 | Torihara | 362/31 |

FOREIGN PATENT DOCUMENTS

| CN | 1515937 A | 7/2004 |
|---|---|---|
| CN | 1517765 C | 8/2004 |

OTHER PUBLICATIONS

State Intellectual Property Office of People's Republic of China; The First Office Action; Dec. 5, 2008; Application No. 200610006447.5; with English Abstract.

* cited by examiner

*Primary Examiner*—Sandra L O'Shea
*Assistant Examiner*—Evan Dzierzynski
(74) *Attorney, Agent, or Firm*—Cantor Colburn LLP

(57) ABSTRACT

A backlight assembly includes a receiving container receiving a light guide plate and a lamp and a fixing member holding the light guide plate. The fixing member supports an incident face of the light guide plate, into which a light emitted from the lamp is incident, thereby preventing movement of the light guide plate towards the lamp. Thus, the backlight assembly may fix the light guide plate to the receiving container without reforming the light guide plate, so that the backlight assembly may supply light having uniform brightness to a liquid crystal display panel to improve its display characteristics.

43 Claims, 17 Drawing Sheets

BACKLIGHT ASSEMBLY AND DISPLAY APPARATUS HAVING THE SAME

This application claims priority to Korean Patent Application No. 2005-10085, filed on Feb. 3, 2005 and all the benefits accruing therefrom under 35 U.S.C. §119, and the contents of which in its entirety are herein incorporated by reference.

BACKGROUND OF THE INVENTION

1. Field of the Invention

The present invention relates to a backlight assembly and a liquid crystal display ("LCD") apparatus having the same. More particularly, the present invention relates to a backlight assembly having improved display characteristics and a display apparatus having the backlight assembly.

2. Description of the Related Art

In general, a liquid crystal display ("LCD") apparatus displays an image using optical and electrical properties of liquid crystal, such as an anisotropic refractive index, an anisotropic dielectric constant, etc.

The LCD apparatus requires a backlight assembly to apply a light to an LCD panel since its display panel is not self-emissive.

The backlight assembly includes a lamp that generates the light, a light guide plate that guides the light to the LCD panel from the lamp, a reflecting sheet disposed under the light guide plate to reflect light leaking from the light guide plate, an optical sheet that improves a brightness of light exiting from the light guide plate, and a receiving container that receives the lamp, the light guide plate, the reflecting sheet, and the optical sheet.

Recently, efforts have been made regarding the LCD apparatus having high brightness in order to improve display quality of the LCD apparatus. As an example of a light guide plate for providing high brightness, a prism light guide plate has been developed. The prism light guide plate includes a fine-pitch prism pattern formed on a lower face thereof. Thus, although only one prism sheet is disposed on the backlight assembly, the LCD apparatus enhances brightness of the light.

However, since the prism light guide plate has the prism pattern formed on the lower face, a dark area or a brightness line occurs at the prism pattern. Further, the prism pattern is easily damaged when the prism light guide plate moves.

BRIEF SUMMARY OF THE INVENTION

The present invention provides a backlight assembly having improved display characteristics.

The present invention also provides a display apparatus having the above-described backlight assembly.

In one exemplary embodiment of the present invention, a backlight assembly includes a light supplying part, a light guide plate, a receiving container, and a fixing member.

The light supplying part generates a light. The light guide plate includes a prism pattern formed on a face thereof to change a path of the light from the light supplying part. The receiving container receives the light supplying part and the light guide plate. The fixing member is coupled to the receiving container to hold the light guide plate. The fixing member includes a body adjacent to a sidewall of the receiving container and a first supporter extended from a first end of the body toward a receiving space of the receiving container.

In another exemplary embodiment of the present invention, a display apparatus includes a display panel and a backlight assembly.

The display panel receives a light and displays an image using the light. The backlight assembly includes a light supplying part, a light guide plate, a receiving container, and a fixing member. The light supplying part generates the light. The light guide plate includes a prism pattern formed on a face thereof to change a path of the light from the light supplying part, and supplies the light to the display panel. The receiving container receives the light supplying part and the light guide plate. The fixing member is coupled to the receiving container to hold the light guide plate. The fixing member includes a body adjacent to a sidewall of the receiving container and a first supporter extended from a first end of the body toward a receiving space of the receiving container.

According to the above, the first supporter of the fixing member supports the light guide plate, thereby preventing the movement of the light guide plate. Thus, the backlight assembly may supply the light having uniform brightness to the liquid crystal display panel to improve its display characteristics.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
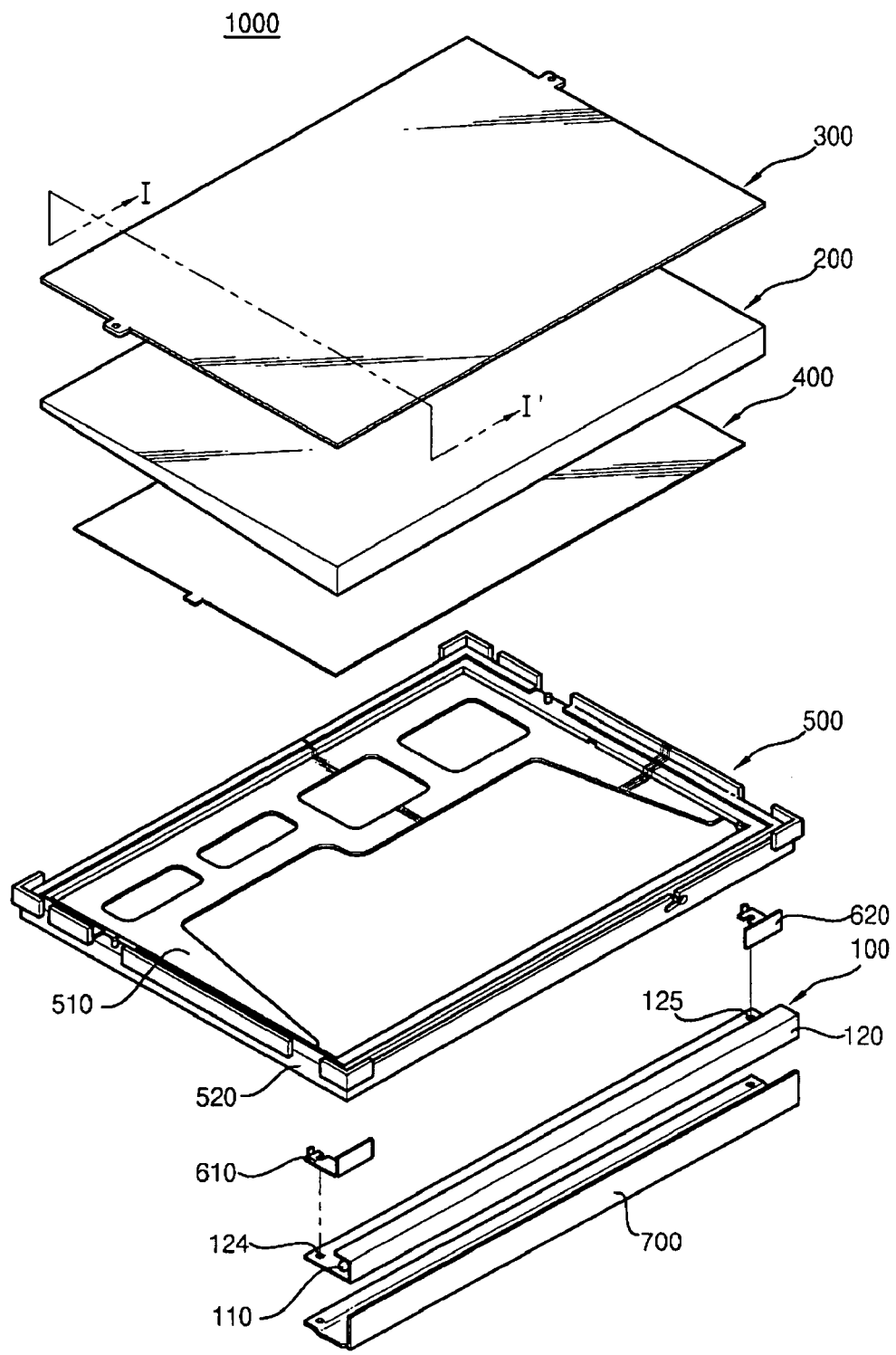
FIG. 1 is an exploded perspective view showing an exemplary embodiment of a backlight assembly according to the present invention.

Hereinafter, the present invention will be explained in detail with reference to the accompanying drawings. In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Figure 2:
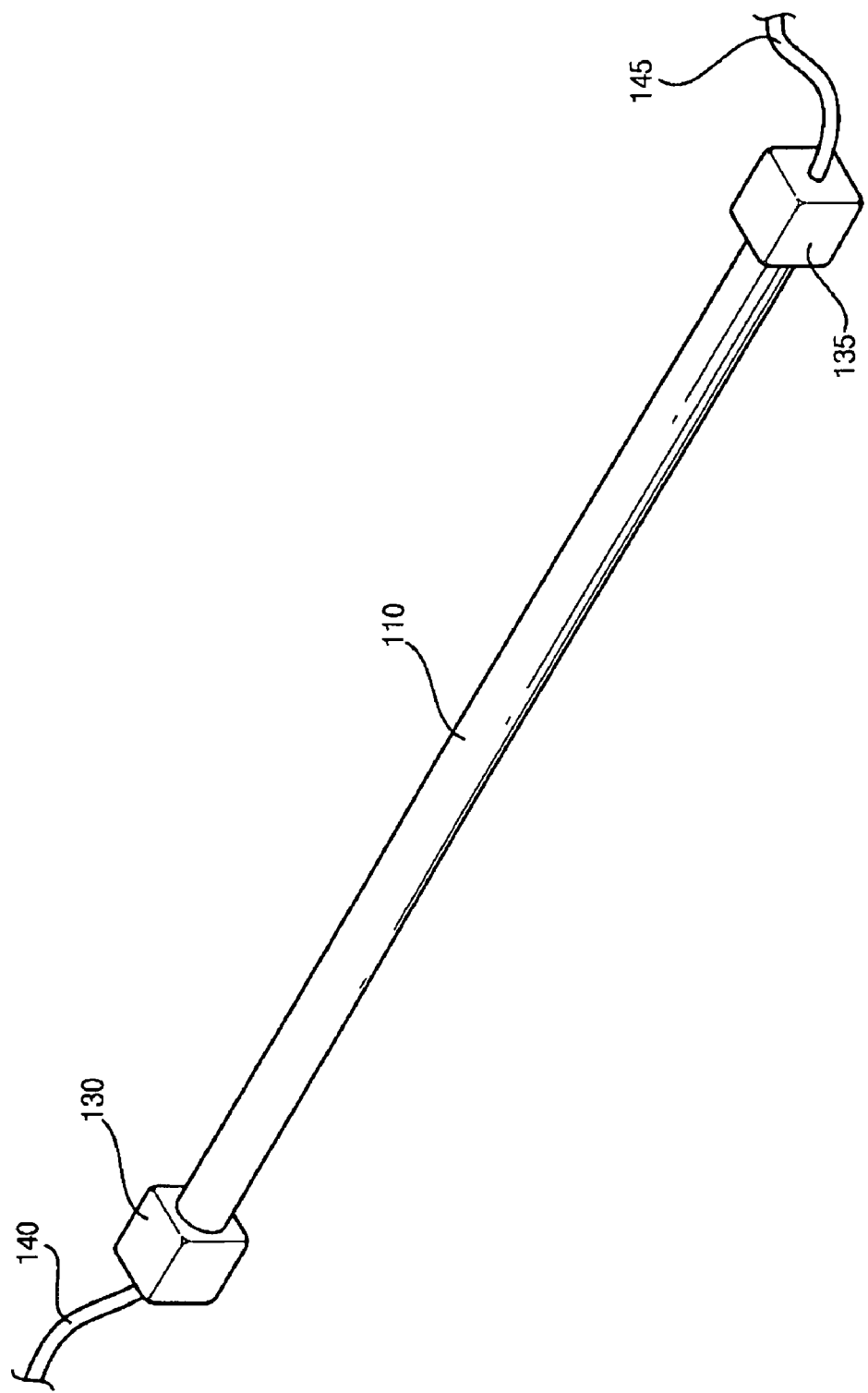
FIG. 2 is a perspective view showing an exemplary lamp from FIG. 1.

FIG. 1 is an exploded perspective view showing an exemplary embodiment of a backlight assembly according to the present invention. FIG. 2 is a perspective view showing an exemplary lamp in FIG. 1.

Referring to FIGS. 1 and 2, a backlight assembly 1000 includes a lamp unit 100 that generates a light, a light guide plate 200 that guides the light from the lamp unit 100, an optical sheet 300 disposed on the light guide plate 200, a reflecting sheet 400 disposed under the light guide plate 200, a receiving container 500, and first and second fixing members 610 and 620 that fix the light guide plate 200 relative to the receiving container 500.

The lamp unit 100 includes a lamp 110 and a lamp cover 120 partially enveloping the lamp 110. The lamp 110 receives a power voltage to generate the light, and the lamp cover 120 receives the lamp 110 therein.

The lamp 110 is placed in a space defined between an incident face 210 of the light guide plate 200, into which the light from the lamp 110 is incident, and the lamp cover 120. In the illustrated embodiment, the backlight assembly 1000 is an edge-type backlight assembly as the light from the lamp 110 is incident into an edge side of the light guide plate 200.

Referring to FIG. 2, the illustrated lamp 110 has a tubular-shaped cold cathode fluorescent lamp ("CCFL") as a light source of the backlight assembly 1000. A first lamp holder 130 and a second lamp holder 135 are coupled to first and second ends, respectively, of the lamp 110. While a particular embodiment for a lamp 110 has been illustrated and is described herein, alternative light sources for the backlight assembly 1000 would also be within the scope of these embodiments.

The lamp 110 receives the power voltage from an external power supply (not shown) through a first wire 140 and a second wire 145 connected to the first and second ends of the lamp 110, respectively. The first and second wires 140 and 145 are outwardly withdrawn through a hole formed through each of the first and second lamp holders 130 and 135, respectively.

Referring again to FIG. 1, the lamp cover 120 includes a reflecting member coated on an inner face of the lamp cover 120 facing the lamp 110. The reflecting member coated on the inner face of the lamp cover 120 reflects the light from the lamp 110 to the light guide plate 200 to enhance a light efficiency.

The light guide plate 200 changes a path of a linear light from the lamp unit 100 so as to emit a planar light towards a display panel. The light guide plate 200 has a wedge shape where a thickness thereof gradually decreases from a light incident side face 210 of the light guide plate 200, which is facing the lamp unit 100, to an opposite end of the light guide plate 200.

The optical sheet 300 on the light guide plate 200 improves brightness characteristics, such as brightness uniformity, of light exiting from the light guide plate 200. The optical sheet 300 may include a prism sheet and a diffusion sheet. The backlight assembly 1000 includes at least one optical sheet, and may further include only one of the prism sheet or the diffusion sheet in accordance with the brightness characteristics, or may alternatively include any number of sheets depending on the optical characteristics required by a liquid crystal display ("LCD") apparatus using the backlight assembly 1000.

The reflecting sheet 400 under the light guide plate 200 reflects light leaked from the light guide plate 200 in order to improve the light efficiency of the backlight assembly 1000. The light guide plate 200 is interposed between the optical sheet 300 and the reflecting sheet 400. The reflecting sheet 400 is placed adjacent a rear or guide face of the light guide plate 200 and the optical sheet 300 is placed adjacent a front or light-exiting face of the light guide plate 200.

The receiving container 500 receives the lamp unit 100, the light guide plate 200, the optical sheet 300, and the reflecting sheet 400. The receiving container 500 includes a bottom 510 and a sidewall 520 extended from the bottom 510 to provide a receiving space between an interior defined by the sidewall 520 and an upper surface of the bottom 510. The reflecting sheet 400, the light guide plate 200, and the optical sheet 300 are sequentially received on the upper surface of the bottom 510 of the receiving container 500.

The lamp unit 100 is inserted into the receiving space of the receiving container 500 from a rear side of the receiving container 500. That is, the lamp unit 100 is moved into the receiving space of the receiving container 500 by moving the lamp unit 100 in a direction defined from a lower surface of the bottom 510 to an upper surface of the bottom 510. The lamp unit 100 is disposed between the incident face 210 of the light guide plate 200 and the sidewall 520 of the receiving container 500. The receiving container 500 will be further described with reference to FIG. 5 below.

The first and second fixing members 610 and 620 are also inserted into the receiving space of the receiving container 500 from a rear side of the receiving container 500 so as to fix the light guide plate 200 relative to the receiving container 500. In an exemplary embodiment, the first and second fixing members 610 and 620 include a metal material, although it would be within the scope of these embodiments to provide first and second fixing members 610 and 620 formed from other suitable materials. The first and second fixing members 610 and 620 are disposed at first and second ends of the lamp 110, respectively, so that the first and second fixing members 610 and 620 may prevent the movement of the light guide plate 200 toward the lamp 110.

The backlight assembly 1000 may further include a back cover 700 outwardly coupled to the receiving container 500. The back cover 700 is disposed relative to the receiving container 500 in a location corresponding to the lamp unit 100 and discharges heat generated from the lamp unit 100. The back cover 700 covers a lower face of the lamp cover 120 and one side face of the sidewall 520 of the receiving container 500.

In the illustrated embodiment, the backlight assembly 1000 includes the back cover 700 as an element separate from the lamp cover 120, but in an alternative embodiment, the backlight assembly 1000 may instead include a lamp cover having a function of the back cover 700 including discharging heat from the lamp unit 100.

Figure 3:
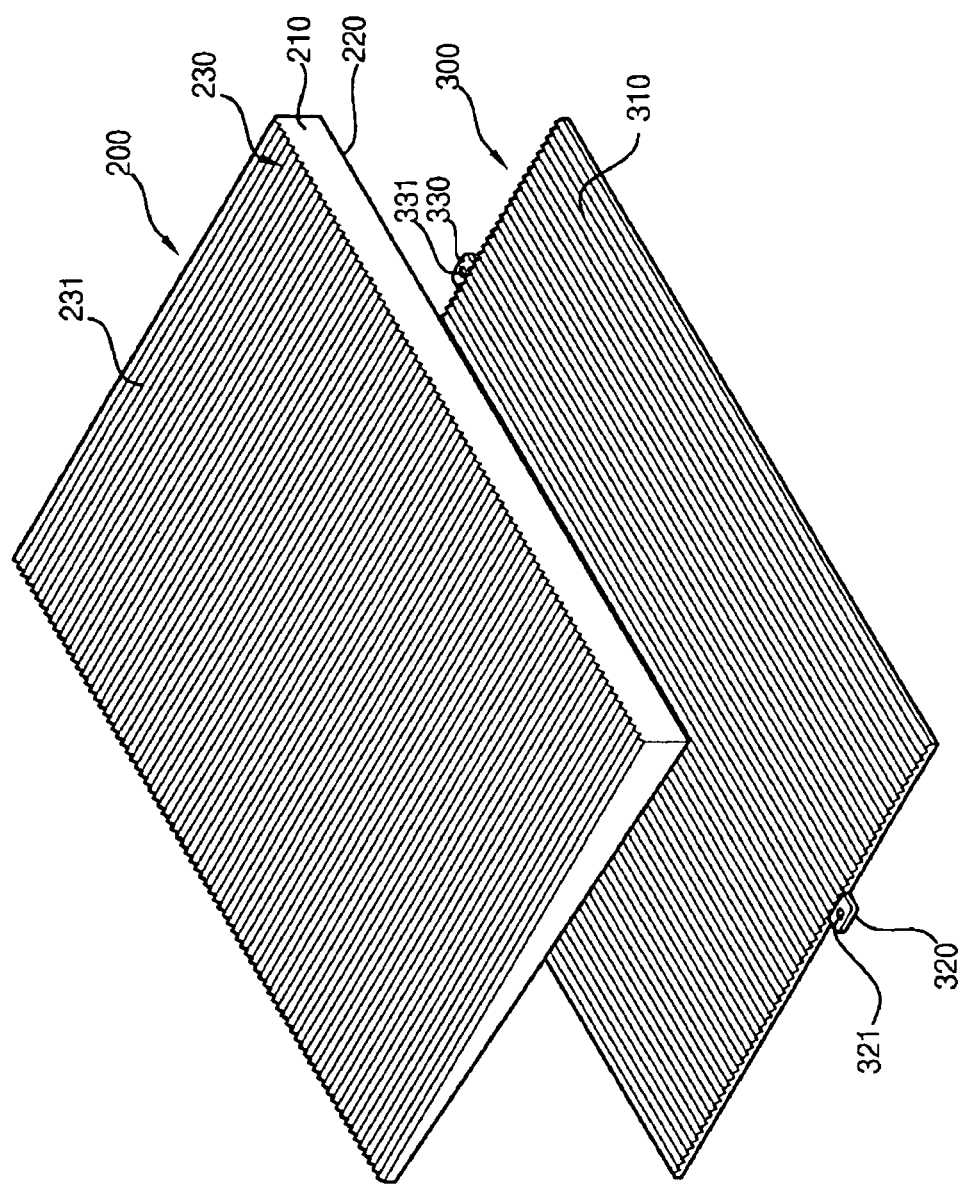
FIG. 3 is a perspective view showing an exemplary light guide plate and an exemplary prism sheet from FIG. 1.

FIG. 3 is a perspective view showing an exemplary light guide plate and an exemplary prism sheet from FIG. 1.

Referring to FIG. 3, the light guide plate 200 includes an incident face 210 into which the light from the lamp unit 100 is incident, an upper or exiting face 220 extended from a first end of the incident face 210, and a rear or guiding face 230 extended from a second end of the incident face 210 opposed to and facing the exiting face 220. The guiding face 230 may thus face a reflecting sheet 400 of the backlight assembly 1000 and the exiting face 220 faces the optical sheet 300.

The guiding face 230 includes a first prism pattern 231 that changes the path of the incident light into the incident face 210 so as to improve brightness at a front visual angle. The first prism pattern 231 is extended in a direction generally perpendicular to a longitudinal direction of the lamp 110.

The optical sheet 300 on the exiting face 220 of the light guide plate 200 includes a second prism pattern 310 extended in a substantially perpendicular direction to that of the first prism pattern 231. The second prism pattern 310 is formed on a lower face of the optical sheet 300, which makes contact with the exiting face 220 of the light guide plate 200. The first and second prism patterns 231 and 310 when used in combination assist in preventing dark areas or brightness lines from occurring in a display panel of an LCD.

The optical sheet 300 further includes a first sheet-fixing portion 320 and a second sheet-fixing portion 330 formed at first and second opposed ends of the optical sheet 300. The first and second sheet-fixing portions 320 and 330 are protruded from the first and second ends of the optical sheet 300, respectively, and disposed on an upper face of the sidewall 520 of the receiving container 500. The first and second sheet-fixing portions 320 and 330 include holes 321 and 331 formed therethrough, respectively, so as to couple the optical sheet 300 to the receiving container 500. If a plurality of optical sheets 300 are employed, they may each include holes aligned with holes 321 and 331 for additionally securing the plurality of sheets 300 to the upper face of the sidewall 520 of the receiving container 500.

Figure 4:
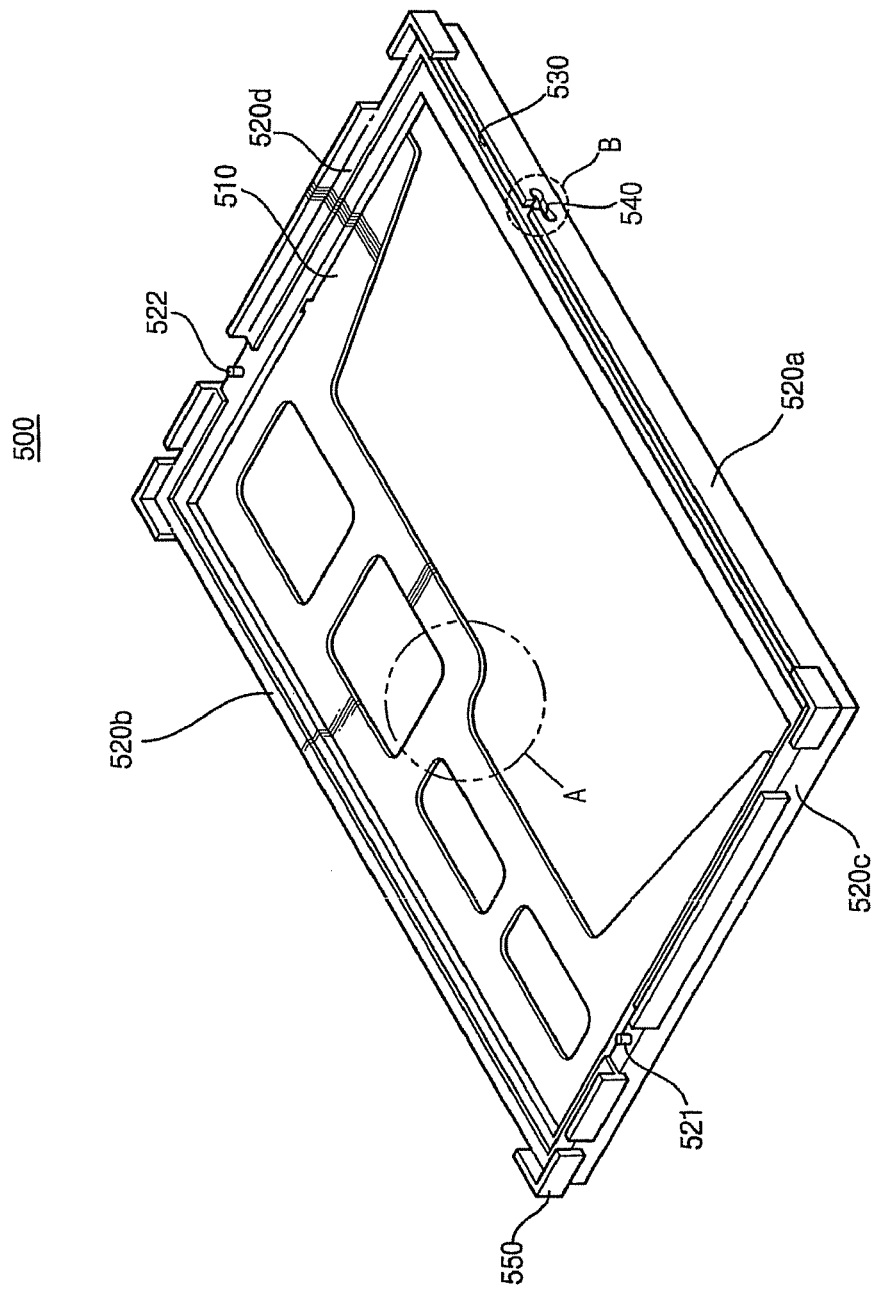
FIG. 4 is a perspective view showing an exemplary receiving container from FIG. 1.
Figure 5:
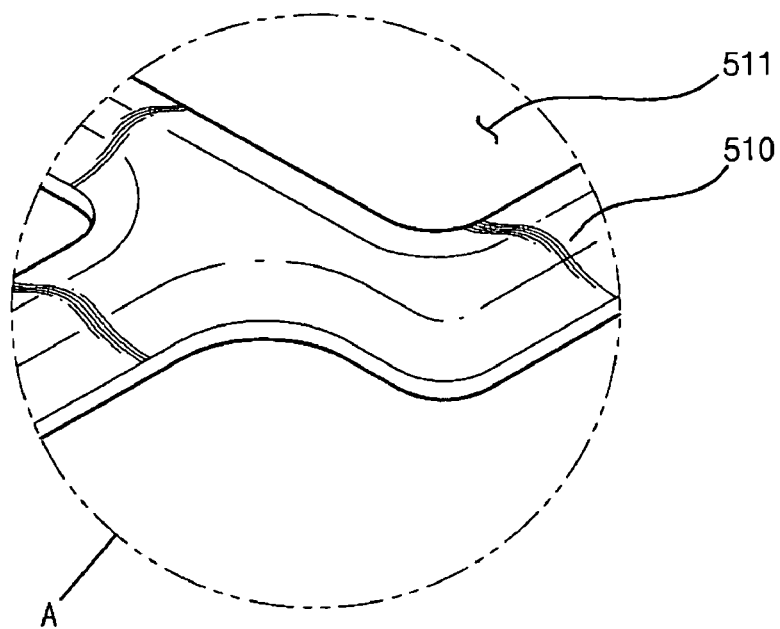
FIG. 5 is an enlarged perspective view of portion 'A' in FIG. 4.

FIG. 4 is a perspective view showing an exemplary receiving container in FIG. 1. FIG. 5 is an enlarged perspective view of portion 'A' in FIG. 4.

Referring to FIGS. 4 and 5, the bottom 510 of the receiving container 500 is partially removed to form a plurality of openings 511, so that the backlight assembly 1000 may have a reduced weight. That is, the bottom 510 is an apertured surface.

As shown in FIG. 5, the bottom 510, on which the reflecting sheet 400 is disposed, has a thickness between the openings 511 that gradually decreases as a predetermined area is spaced further from a central portion of the bottom 510 between the openings 511 so as to prevent the deformation of the first prism pattern 210. In other words, a central portion of the ribs between the openings 511 has a greater thickness than edge portions of the ribs between the openings 511.

That is, the light guide plate 200 is received on an inner or upper face of the bottom 510 and the first prism pattern 231 is formed on the rear or lower face of the light guide plate 200. In a case where an end of the bottom 510 through which the openings 511 are formed has a thickness thicker than or equal to the center portion of the bottom 510 corresponding between the openings 511, the first prism pattern 231 may be abraded due to a contact between the end of the bottom 510 and the first prism pattern 231, even if the reflecting sheet 400 is interposed there between. As a result, the brightness of the light from the light guide plate 200 would be deteriorated. In order to prevent such deterioration of the brightness of the light, the inner face of the bottom 510 is inclined toward the openings 511. In other words, the first prism pattern 231 does not make contact with and does not otherwise abut any sharp edges or other abrasive surfaces of the bottom 510.

Referring to FIG. 4, the sidewall 520 of the receiving container 500 includes a first sidewall portion 520a, a second sidewall portion 520b, a third sidewall portion 520c, and a fourth sidewall portion 520d. The first sidewall portion 520a faces the second sidewall portion 520b, and the third sidewall portion 520c faces the fourth sidewall portion 520d. Thus, as illustrated, the sidewall 520 forms a generally rectangular shape, although other shapes would also be within the scope of these embodiments.

The lamp unit 100 is received adjacent to the first sidewall portion 520a. The third and fourth sidewall portions 520c and 520d include a first fixing protrusion 521 and a second fixing protrusion 522 formed thereon, respectively. The first and second fixing protrusions 521 and 522 are combined with the first and second sheet-fixing portions 320 and 330, respectively.

The first and second fixing protrusions 521 and 522 are inserted into the holes 321 and 331 of the first and second sheet-fixing portions 320 and 330, respectively, thereby fixing the optical sheet 300 to the receiving container 500.

The receiving container 500 includes a receiving groove 530 formed on the first sidewall portion 520a, extending generally parallel to the first sidewall portion 520a, and a fixing hole 540 formed through the first sidewall portion 520a. The receiving groove 530 receives the first and second wires 140 and 145 of the lamp 110, and the fixing hole 540 fixes the first and second wires 140 and 145 with respect to the receiving container 500.

Figure 21:
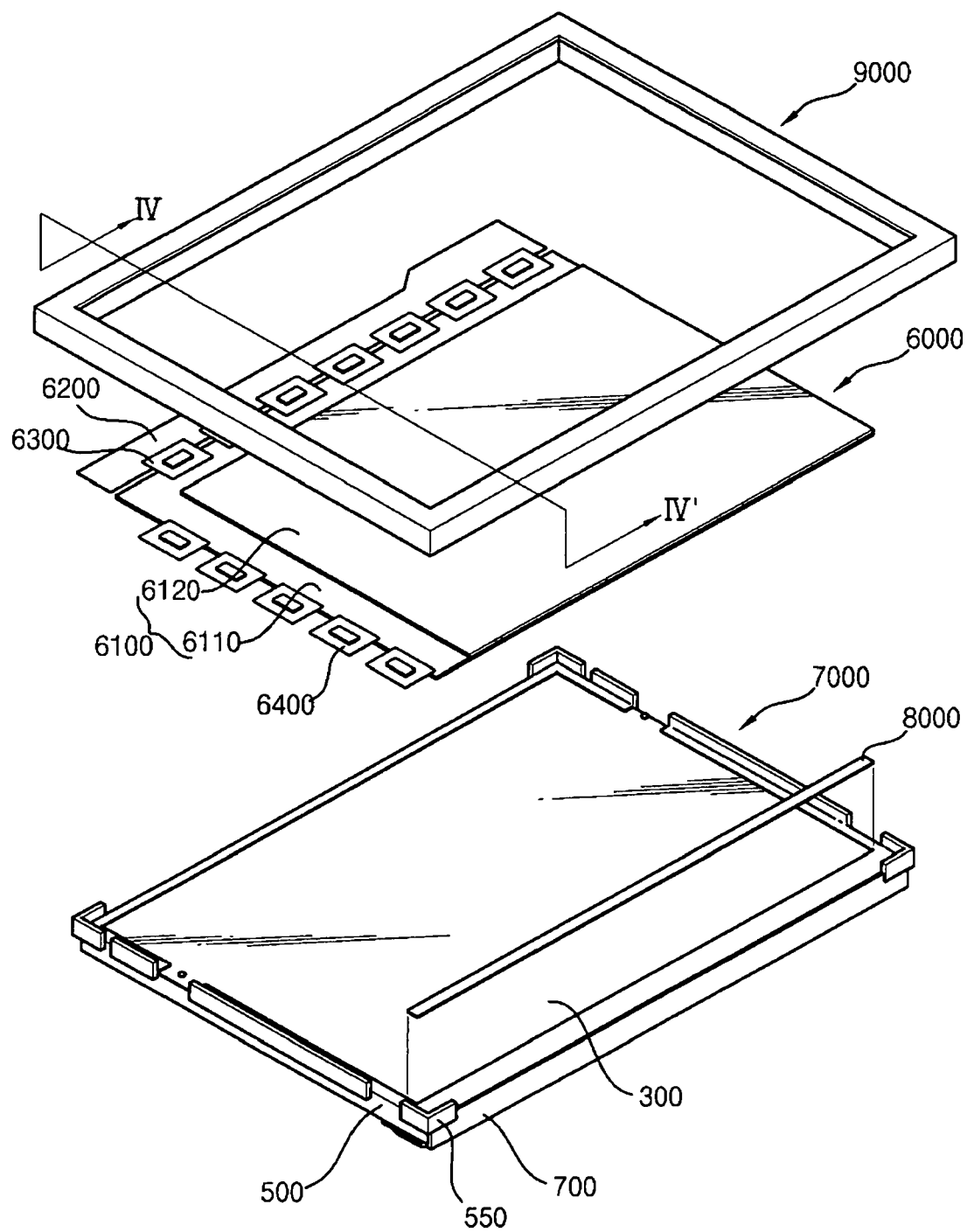
FIG. 21 is an exploded perspective view showing an exemplary embodiment of a liquid crystal display apparatus according to the present invention.

The receiving container 500 further includes a guide portion 550 formed at four corners of the sidewall 520 to guide the LCD panel (such as shown in FIG. 21) displaying the image. The guide portion 550 is disposed on the sidewall 520 and outwardly protruded further from an outer side of the sidewall 520.

Figure 6:
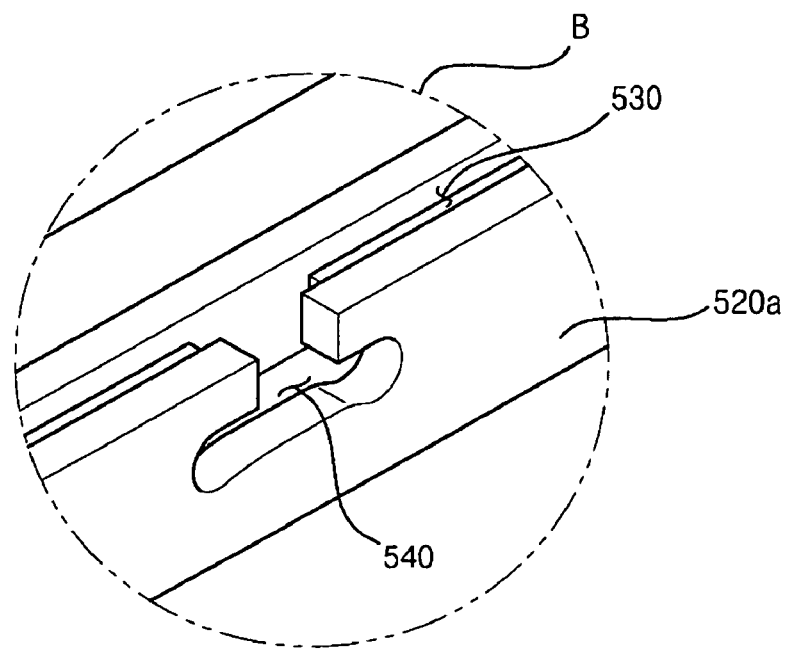
FIG. 6 is an enlarged perspective view of portion 'B' in FIG. 4.
Figure 7:
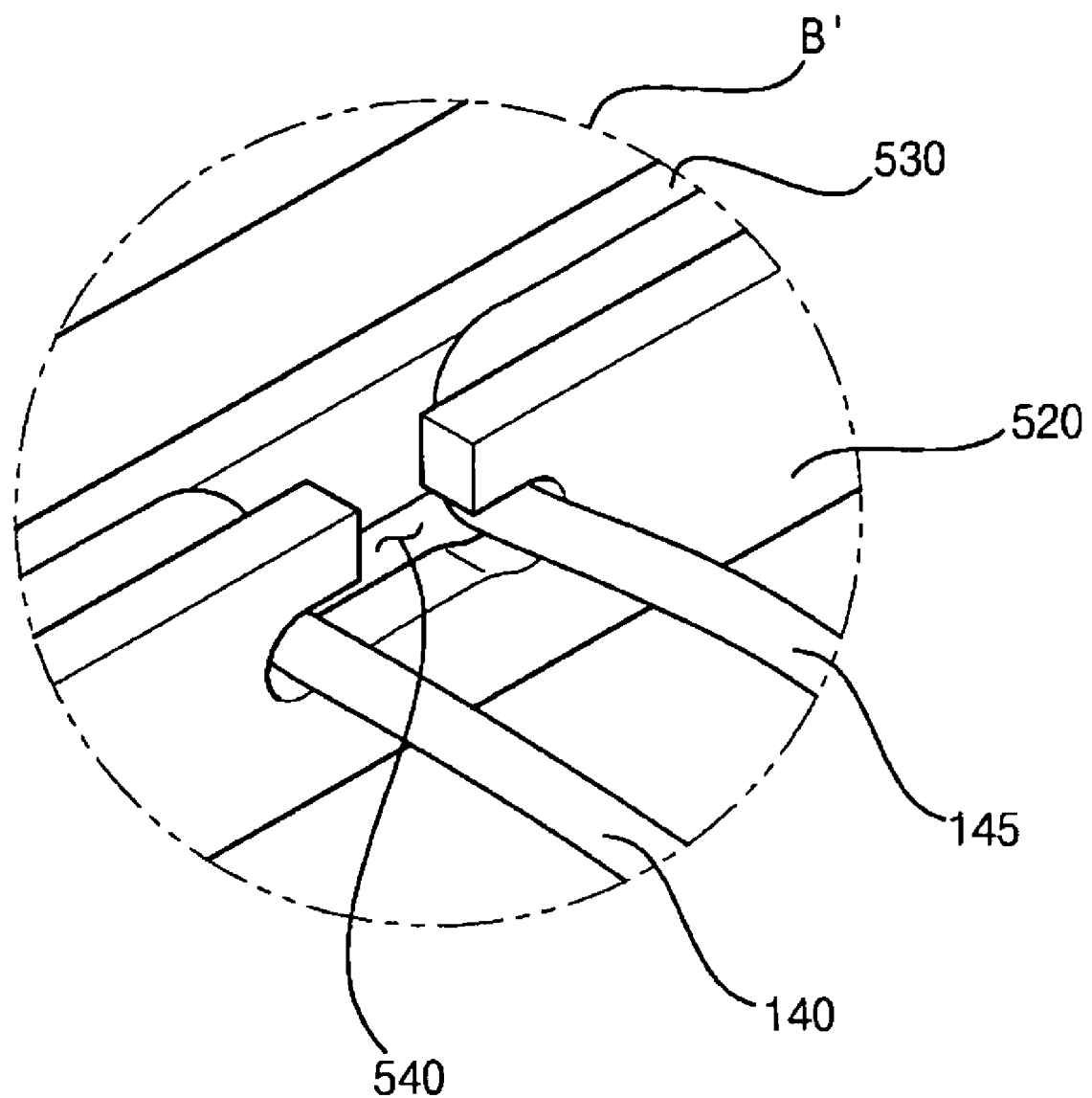
FIG. 7 is a perspective view showing wires received into an exemplary groove in FIG. 4.

FIG. 6 is an enlarged perspective view of portion 'B' in FIG. 4. FIG. 7 is a perspective view showing wires received into a groove in FIG. 4.

Referring to FIGS. 6 and 7, the receiving groove 530 is extended in a longitudinal direction of the first sidewall portion 520a, generally parallel to a longitudinal axis of the lamp 110, and the fixing hole 540 is disposed adjacent to a portion of the receiving groove 530. The fixing hole 540 penetrates the first sidewall portion 520a. An upper face of the first sidewall portion 520a is partially removed such that the receiving groove 530 is divided into two areas with reference to the fixing hole 540. The first and second wires 140 and 145 are received into the two areas of the receiving groove 530, respectively.

An inner face of the first sidewall portion 520a forming the fixing hole 540 is curved in association with a cross-sectional profile of the first and second wires 140 and 145 so as to prevent pinching, cutting, or otherwise abrading the first and second wires 140, 145 received within the fixing hole 540. The first and second wires 140 and 145 in the receiving groove 530 are passed through the fixing hole 540 by moving the wires 140, 145 through the partially removed portion of the upper face of the first sidewall portion 520a and then seating the wires 140, 145 into opposed curved wire seating areas of the fixing hole 540.

As shown in FIG. 7, the first and second wires 140 and 145 are extended from the lamp unit 100 (as shown in FIGS. 1 and 2), received into the receiving groove 530, and outwardly withdrawn through the fixing hole 540, so that the first and second wires 140 and 145 may be electrically connected to an external power supply (not shown).

Figure 8:
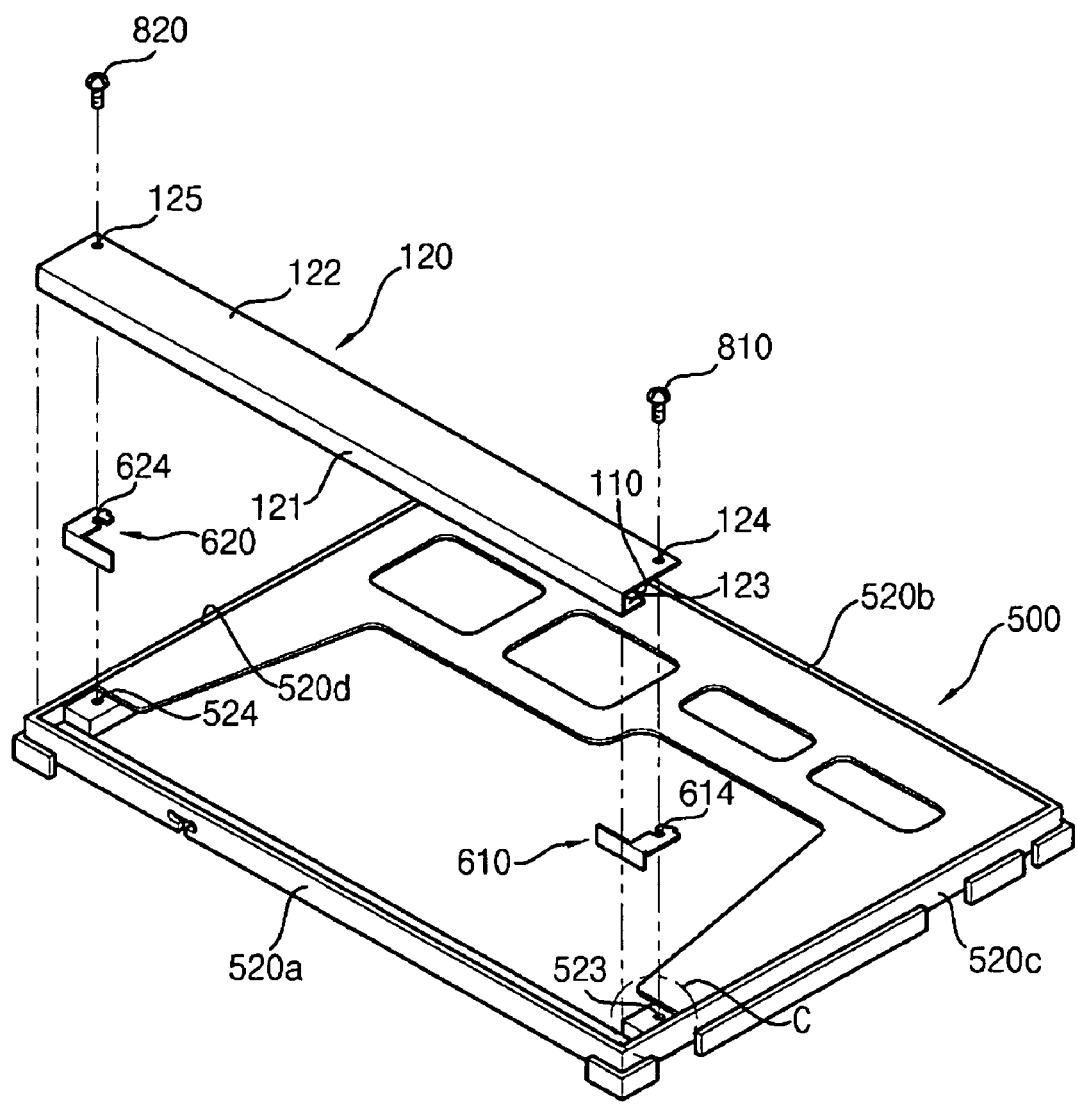
FIG. 8 is an exploded perspective view showing an exemplary embodiment of an assembly of a receiving container, first and second fixing members, and a lamp cover from FIG. 1.
Figure 9:
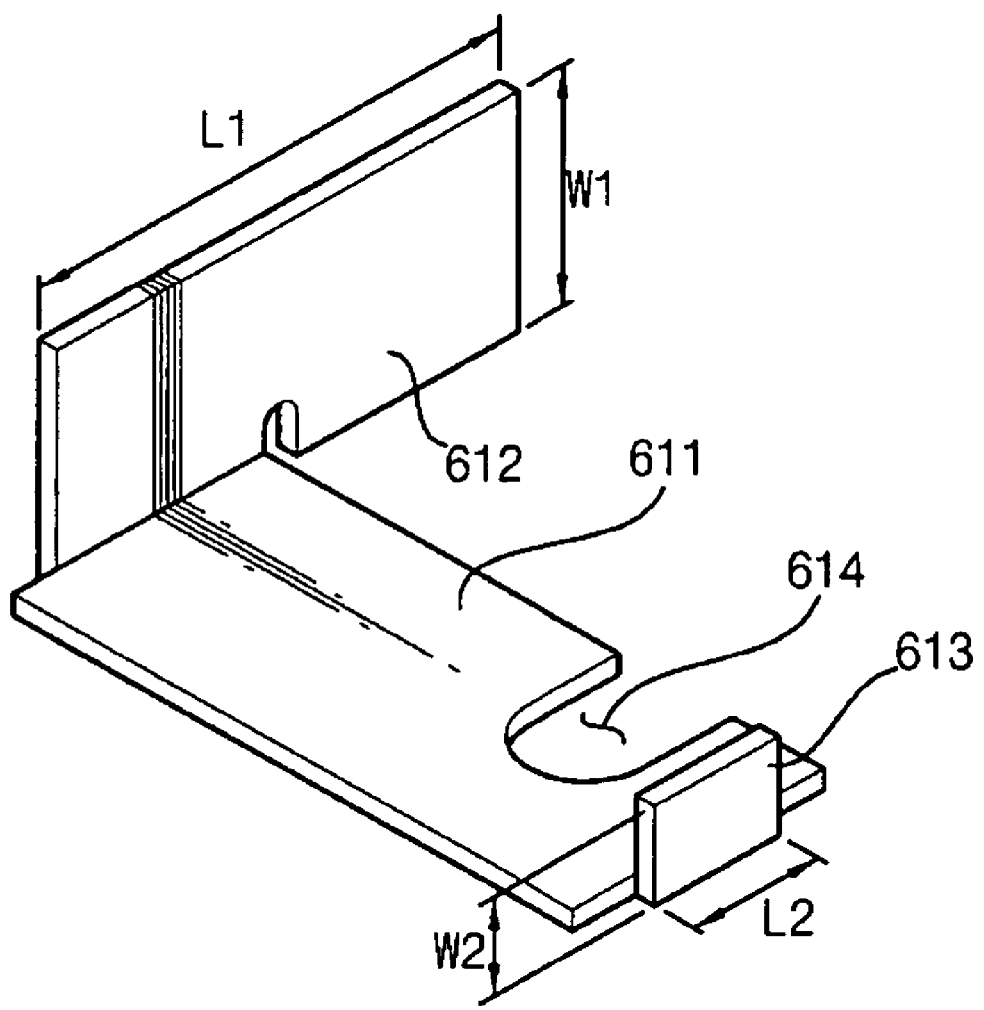
FIG. 9 is a perspective view showing an exemplary first fixing member from FIG. 1.

FIG. 8 is an exploded perspective view showing an exemplary embodiment of an assembly of a receiving container, first and second fixing members, and a lamp cover from FIG. 1. FIG. 9 is a perspective view showing an exemplary first fixing member from FIG. 1.

Referring to FIGS. 8 and 9, where a rear view of the receiving container 500 is shown in FIG. 8, the first fixing member 610 is disposed under the lower face of the third sidewall portion 520c of the receiving container 500. The third sidewall portion 520c includes a first engaging recess 523 formed through the lower face thereof. The first engaging recess 523 is engaged with the lamp cover 120 and the first fixing member 610 by a screw 810 as will be further described below.

The second fixing member 620 is disposed under the lower face of the fourth sidewall portion 520d, which faces the third sidewall portion 520c. The fourth sidewall portion 520d includes a second engaging recess 524 formed through the lower face thereof. The second engaging recess 524 is engaged with the lamp cover 120 and the second fixing member 620 by a screw 820 as will be further described below.

In the present embodiment, the first and second fixing members 610 and 620 both have the same function and structure. Thus, only the first fixing member 610 will be described in detail and detailed descriptions of the second fixing member 620 will be omitted.

Referring to FIG. 9, the first fixing member 610 includes a body portion 611 disposed under the lower face of the third sidewall portion 520c, a first supporting portion 612 extended in a first direction from a first end of the body portion 611 and a second supporting portion 613 extended in the first direction from a second end of the body portion 611. First supporting portion 612 and second supporting portion 613 may be perpendicularly disposed relative to the body portion 611. The first supporting portion 612 faces the second supporting portion 613, such that the first supporting portion 612 and second supporting portion 613 may be parallel to each other. The second supporting portion 613 is coupled to the receiving container 500, and the second supporting portion 613 is coupled to the third sidewall portion 520c of the receiving container 500 so as to fix the first fixing member 610 to the receiving container 500, as will be further described below.

The body portion 611 includes a coupling hole 614 corresponding to the first engaging recess 523. The coupling hole 614 may include an opening extending from one side of the body portion 611 as shown, or may alternatively include an aperture passing through an interior section of the body portion 611.

The first supporting portion 612 has a width W1 wider than a width W2 of the second supporting portion 613 and a length L1 longer than a length L2 of the second supporting portion 613. The length L1 may also be longer than a length of the body portion 611 to partially support the incident face 210 of the light guide plate 200.

As shown in FIG. 8, when the first and second fixing members 610 and 620 are coupled to the receiving container 500, the lamp cover 120 is inserted inside the receiving container 500 and longitudinally received at the first sidewall portion 520a.

The lamp cover 120 includes a first portion 121 having an inner surface facing the incident face 210 of the light guide plate 200, a second portion 122 extended from a first end of the first portion 121 and a third portion 123 extended from a second end of the first portion 121 and facing the second portion 122. The second portion 122 and the third portion 123 may be generally parallel to each other. The second portion 122 includes a first engaging hole 124 and a second engaging hole 125, disposed adjacent first and second opposed ends of the second portion 122, the first and second engaging holes 124, 125 corresponding to the first and second engaging recesses 523 and 524, respectively.

An outer surface of the first portion 121 of the lamp cover 120 makes contact with an inner face of the first sidewall portion 520a, the third portion 123 makes contact with an upper face of the first sidewall portion 520a and the second portion 122 is exposed through the openings 511 of the receiving container 500.

The lamp cover 120, and the first and second fixing members 610 and 620 are coupled to the receiving container 500 by means of a first screw 810 and a second screw 820 although alternate securement devices, including alternate non-adhesive first and second fixing members, would also be within the scope of these embodiments. When the lamp cover 120 and the first and second fixing members 610 and 620 are disposed at the sidewall 520 of the receiving container 500, the first screw 810 sequentially passes through the first engaging hole 124 of the lamp cover 120, the coupling hole 614 of the first fixing member 610, and the first engaging recess 523 on the third sidewall portion 520c. The second screw 820 sequentially passes through the second engaging hole 125 of the lamp cover 120, the coupling recess 624 of the second fixing member 620, and the second engaging recess 524 on the fourth sidewall portion 520d. Thus, the lamp cover 120, the first and second fixing members 610, 620, and the receiving container 500 are fixed relative to each other.

Figure 10:
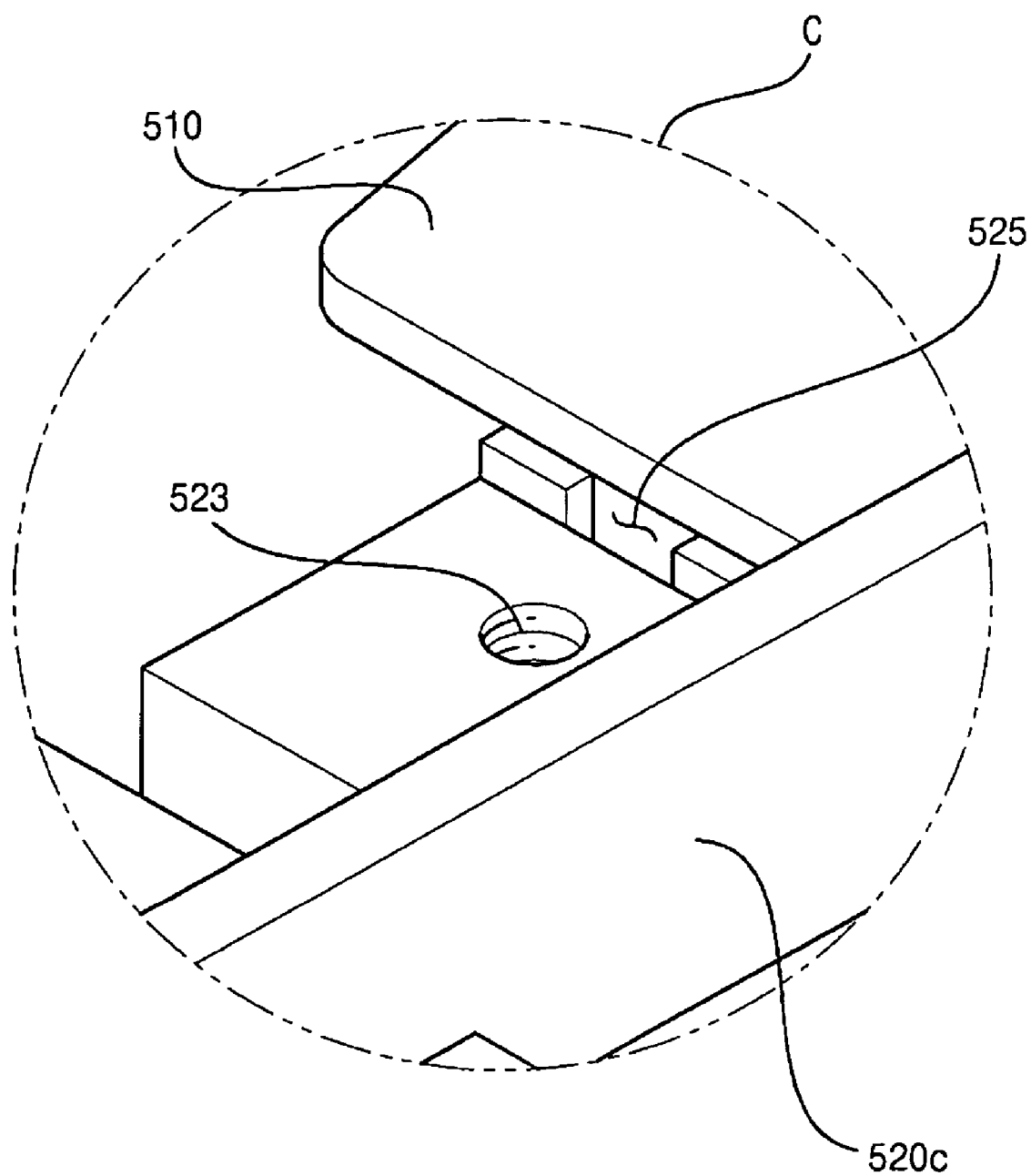
FIG. 10 is an enlarged perspective view of portion 'C' in FIG. 8.

FIG. 10 is an enlarged perspective view of portion 'C' in FIG. 8.

Referring to FIG. 10, the third sidewall portion 520c of the receiving container 500 includes a first insertion recess 525, corresponding to the first fixing member 610, such that the second supporting portion 613 of the first fixing member 610 is inserted within the first insertion recess 525. The third sidewall portion 520c also includes the first engaging recess 523 into which the first screw 810 is inserted. The second supporting portion 613 may be inserted into the first insertion recess 525 and the first screw 810 may be inserted into the first engaging recess 523 both in a direction substantially perpendicular to the body portion 611 of the first fixing member 610.

Although not shown, it should be understood that the fourth sidewall portion 520d of the receiving container 500 includes a second insertion recess corresponding to the second fixing member 620 such that a second supporting portion of the second fixing member 620 is inserted within the second insertion recess.

Figure 11:
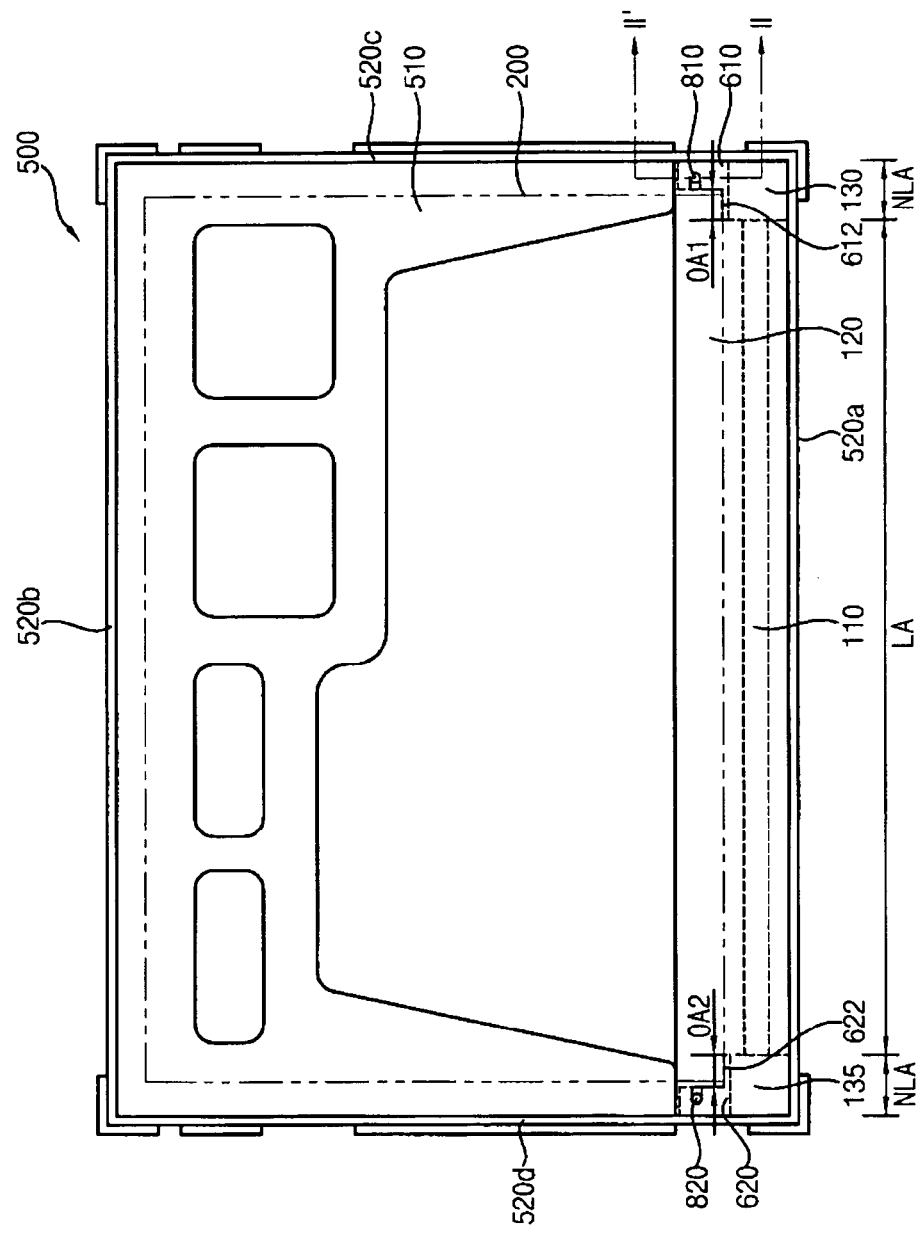
FIG. 11 is a plan view showing an exemplary embodiment of an assembly of the receiving container, the first and second fixing members, and the lamp cover from FIG. 1.

FIG. 11 is a plan view showing an exemplary embodiment of an assembly of the receiving container, the first and second fixing members, and the lamp cover in FIG. 1.

Referring to FIG. 11, the light guide plate 200 is received from a front side of the receiving container 500. On the contrary, the lamp cover 120 having the lamp 110, and the first and second fixing members 610 and 620 are received from a rear side of the receiving container 500.

The first and second fixing members 610 and 620 are opposite to each other and positioned on opposing sides of the receiving container 500. The first fixing member 610 at the third sidewall portion 520c of the receiving container 500 is disposed adjacent to the first lamp holder 130 and the second fixing member 620 at the fourth sidewall portion 520d of the receiving container 500 is disposed adjacent to the second lamp holder 135.

The first supporting portion 612 of the first fixing member 610 is inwardly protruded into the receiving space of the receiving container 500 more than the third sidewall portion 520c and is disposed between the first lamp holder 130 and a portion of the incident face 210 of the light guide plate 200. The first supporting portion 612 of the first fixing member 610 inwardly protrudes partially in a direction towards the fourth sidewall portion 520d to support a portion of the incident face 210 of the light guide plate 200.

An overlapped area OA1 where the first supporting portion 612 of the first fixing member 610 is overlapped with the incident face 210 of the light guide plate 200 is positioned in an area where the first lamp holder 130 is also overlapped with the incident face 210 of the light guide plate 200 such that the first supporting portion 612 of the first fixing member 610 is not overlapped with a light emitting area LA of the lamp 110. That is, the first fixing member 610 is positioned in a non-light emitting area NLA of the lamp 110, which is covered by the first lamp holder 130. Therefore, employment of the first fixing member 610 does not interfere with the light emitting area LA of the lamp 110.

Since the first lamp holder 130 includes a material through which the light may not transmit, an area at which the first lamp holder 130 is positioned is the non-light emitting area NLA. The first fixing member 610 is limited to a positioning in the non-light emitting area NLA, thereby enhancing the light amount supplied to the light guide plate 200 from the lamp 110.

A first supporting portion 622 of the second fixing member 620 is inwardly protruded more than the fourth sidewall portion 520d into the receiving space of the receiving container 500 and is disposed between the second lamp holder 135 and a portion of the incident face 210 of the light guide plate 200. The first supporting portion 622 of the second fixing member 620 partially supports the incident face 210 of the light guide plate 200.

An overlapped area OA2 where the first supporting portion 622 of the second fixing member 620 is overlapped with the incident face 210 of the light guide plate 200 is positioned in an area where the second lamp holder 135 is overlapped with the incident face 210 of the light guide plate 200 such that the first supporting portion 622 of the second fixing member 620 is not overlapped with the light emitting area LA and is limited in positioning to a non light emitting area NLA.

As described above, the first and second fixing members 610 and 620 support first and second end portions of the incident face 210 adjacent to the first and second lamp holders 130 and 135, thereby preventing movement of the light guide plate 200 towards the lamp 110 and thus preventing damage of the lamp 110.

Thus, the backlight assembly 1000 may fix the light guide plate 200 to the receiving container 500 without reforming or otherwise adjusting the light guide plate 200, so that the backlight assembly 1000 may supply light having uniform brightness.

Figure 12:
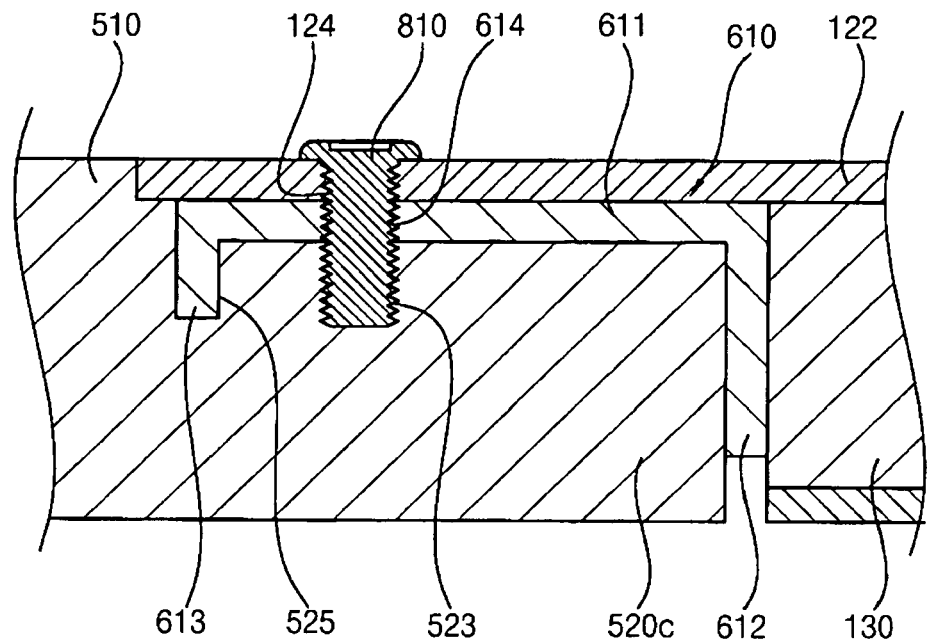
FIG. 12 is a cross-sectional view taken along line II-II' of FIG. 11.

FIG. 12 is a cross-sectional view taken along line II-II' of FIG. 11.

Referring to FIG. 12, the first fixing member 610 is disposed at an end of the third sidewall portion 520c adjacent to the first lamp holder 130. The second supporting portion 613 of the first fixing member 610 is inserted into the first insertion recess 525 formed on the third sidewall portion 520c, so that the first fixing member 610 is fixed to the receiving container 500 as shown.

The first supporting portion 612 of the first fixing member 610 covers a portion of or the entire end of the third sidewall portion 520c inwardly protruded from the receiving container 500. The first supporting portion 612 is disposed between the end of the third sidewall portion 520c and the first lamp holder 130.

The lamp cover 120, in which the lamp 110 is received, is received in the receiving container 500 to which the first fixing member 610 is coupled.

The first screw 810 passes through the first engaging hole 124 and the coupling hole 614 of the first fixing member 610 and is engaged with the first engaging recess 523 of the third sidewall portion 520c. Thus, the lamp cover 120 may be coupled to the receiving container 500 by trapping the first fixing member 610 there between, thereby enhancing a coupling force between the first fixing member 610 and the receiving container 500.

Figure 13:
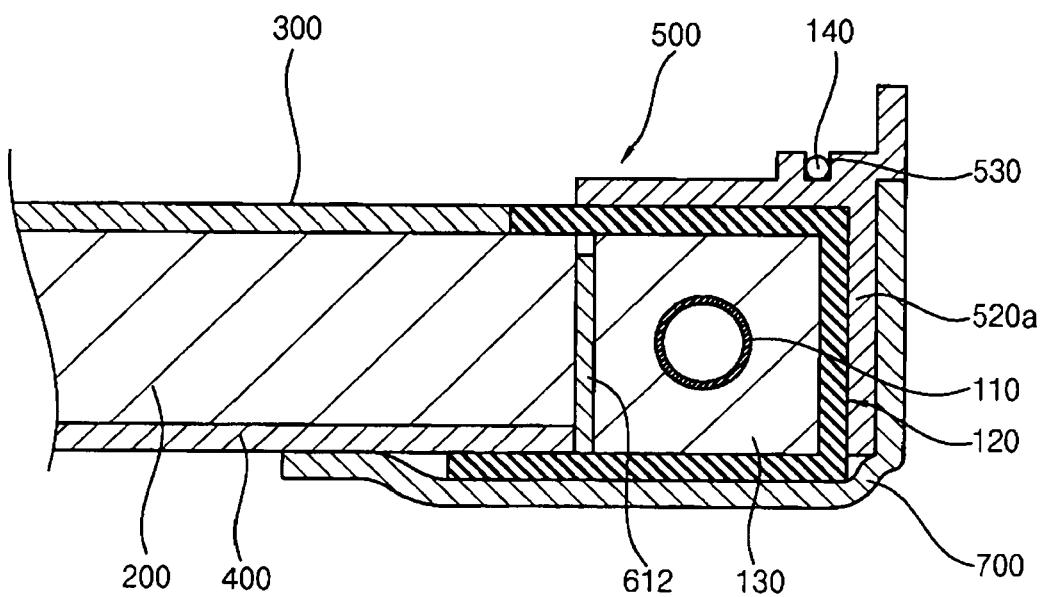
FIG. 13 is a cross-sectional view taken along line I-I' of FIG. 1.

FIG. 13 is a cross-sectional view taken along line I-I' of FIG. 1.

Referring to FIG. 13, the reflecting sheet 400 is received on an upper surface of the bottom 510 within the receiving container 500 and a rear or guide face of the light guide plate 200 is disposed on the reflecting sheet 400. The optical sheet 300 is disposed on the upper or light exiting face of the light guide plate 200.

The lamp cover 120 in which the lamp 110 is received is disposed between the incident face 210 of the light guide plate 200 and the first sidewall portion 520a of the receiving container 500, with the lamp 110, the lamp holders 130, 135, and first and second fixing members 610, 620 disposed the lamp cover 120 and the incident face 210.

The first supporting portion 612 of the first fixing member 610 is disposed between the first lamp holder 130 and the incident face 210 of the light guide plate 200. The first supporting portion 612 of first fixing member 610 supports the incident face 210 to prevent the movement of the light guide plate 200 towards the lamp 110 due to an externally provided impact.

The receiving groove 530 is formed on the first sidewall portion 520a, and the first and second wires 140 and 145 electrically connected to the lamp 110 are received in the receiving groove 530.

The back cover 700 is outwardly coupled to the receiving container 500 and disposed in an area corresponding to the lamp unit 100. The back cover 700 makes contact with an outer surface of the second portion 122 of the lamp cover 120 to rapidly discharge heat generated from the lamp unit 100. A side face of the back cover 700 makes contact with an outer surface of the first side portion 520a.

Figure 14:
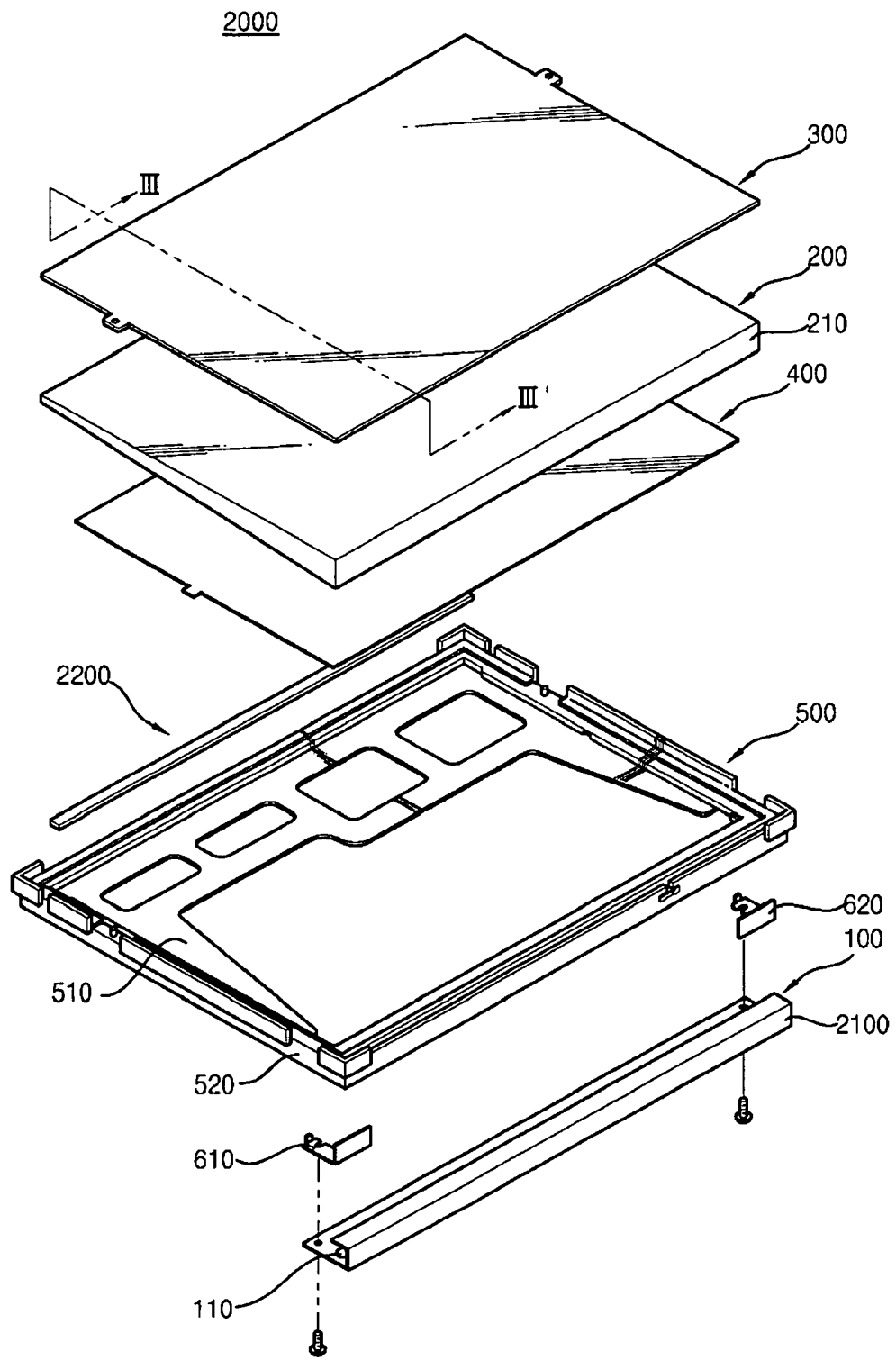
FIG. 14 is an exploded perspective view showing another exemplary embodiment of a backlight assembly according to the present invention.

FIG. 14 is an exploded perspective view showing another exemplary embodiment of a backlight assembly according to the present invention.

Referring to FIG. 14, a backlight assembly 2000 has a same function and structure as the backlight assembly 1000 shown in FIG. 1 except for a lamp cover 2100 and an adhesive member 2200. Thus, in FIG. 14, the same reference numerals denote the same elements in FIG. 1, and thus any further repetitive descriptions of the same elements will be omitted.

The backlight assembly 2000 includes a lamp unit 100 that generates a light, a light guide plate 200 disposed at a side of the lamp unit 100 to guide the light from the lamp unit 100, an optical sheet 300 disposed on a light exiting face of the light guide plate 200 to improve light characteristics such as brightness, uniformity or the like of the light exiting from the light guide plate 200, a reflecting sheet 400 disposed under a guide face of the light guide plate 200 to reflect the light leaked from the light guide plate 200, a receiving container 500, an adhesive member 2200 that adheres the light guide plate 200 to the receiving container 500, and first and second fixing members 610 and 620 that fix the light guide plate 200 to the receiving container 500.

The lamp unit 100 includes a lamp 110 that generates the light in response to a power voltage and a lamp cover 2100 that receives the lamp 110. The lamp cover 2100 reflects the light from the lamp 110 towards the light guide plate 200 and substantially simultaneously discharges the heat from the lamp 110.

In this embodiment, the backlight assembly 2000 does not include a separate back cover since the lamp cover 2100 performs the function of the back cover 700 of FIG. 1, but the backlight assembly 2000 may alternatively have a separate back cover outwardly coupled to the receiving container 500.

The light guide plate 200 includes a first prism pattern formed on a rear or guide face of the light guide plate 200 to change a linear light from the lamp unit 100 and emit a planar light through the light exiting face of the light guide plate 200. The light guide plate 200 has a wedge shape where a thickness thereof gradually decreases from a light incident face 210 to an opposite face, as a distance is spaced further apart from the light incident side face of the light guide plate 200.

The receiving container 500 receives the lamp unit 100, the light guide plate 200, the optical sheet 300, and the reflecting sheet 400. The receiving container 500 includes a bottom 510 and a sidewall 520 extended from the bottom 510 to provide a receiving space. The reflecting sheet 400, the light guide plate 200, and the optical sheet 300 are sequentially received in the receiving space.

The adhesive member 2200 is disposed between the light guide plate 200 and an upper surface of the bottom 510 of the receiving container 500 to adhere the light guide plate 200 to the receiving container 500. The adhesive member 2200 is a double-sided adhesive tape and is disposed under the rear face, or guide face, of the light guide plate 200. While a particular embodiment of an adhesive member 2200 is described, alternative adhesive members would also be within the scope of these embodiments.

In the illustrated embodiment, the adhesive member 2200 is disposed at a first side of the light guide plate 200 opposite to a first side (incident side face 210) of the light guide plate 200, which is adjacent to the lamp unit 100. Additionally or alternatively, the adhesive member 2200 may be disposed at the first side, the second side, or sides between the first and second sides of the light guide plate 200 according to an assemblability of the backlight assembly 2000 and a shape of the receiving container 500.

The first and second fixing members 610 and 620 are received within the receiving container 500 in an area adjacent to an area corresponding to the location within the receiving container 500 for receiving the lamp unit 100, and coupled to a rear side of the receiving container 500. The first and second fixing members 610 and 620 include a metal material, although other materials would be within the scope of these embodiments, and support the incident face 210 of the light guide plate 200 such that the light guide plate 200 does not move towards the lamp 110.

As described above, the backlight assembly 2000 may fix the light guide plate 200 to the receiving container 500 using the first and second fixing members 610 and 620 and the adhesive member 2200 without reforming the light guide plate 200, so that the backlight assembly 2000 may supply light having uniform brightness. Also, this embodiment eliminates a separate back cover by employing the lamp cover 2100 that discharges heat from the lamp 110.

Figure 15:
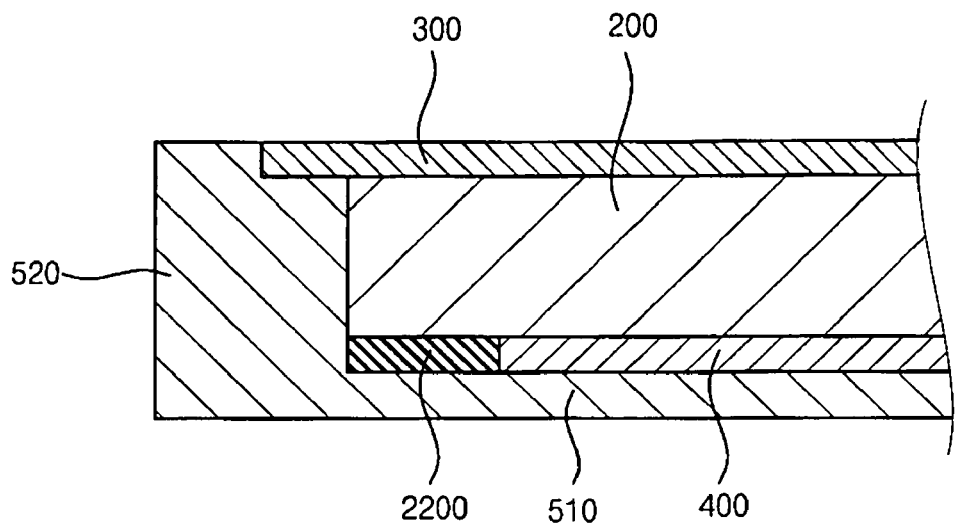
FIG. 15 is a cross-sectional view taken along line III-III' of FIG. 14 showing the backlight assembly in FIG. 14.

FIG. 15 is a cross-sectional view taken along line III-III' showing the backlight assembly in FIG. 14.

Referring to FIG. 15, the reflecting sheet 400 and the adhesive member 2200 are disposed on an upper surface of the bottom 510 of the receiving container 500, and the light guide plate 200 is disposed on the reflecting sheet 400 and the adhesive member 2200.

The reflecting sheet 400 is not overlapped with the adhesive member 2200. That is, the reflecting sheet 400 is disposed on the bottom 510 of the receiving container 500 but not on the portion of the bottom 510 on which the adhesive member 2200 is disposed. The adhesive member 2200 is disposed adjacent to the second side of the light guide plate 200 opposite to the first side (incident face 210) into which the light is incident into the light guide plate 200. The adhesive member 2200 is disposed between the bottom 510 of the receiving container 500 and the light guide plate 200, so that the adhesive member 2200 may adhere the light guide plate 200 to the receiving container 500.

Figure 16:
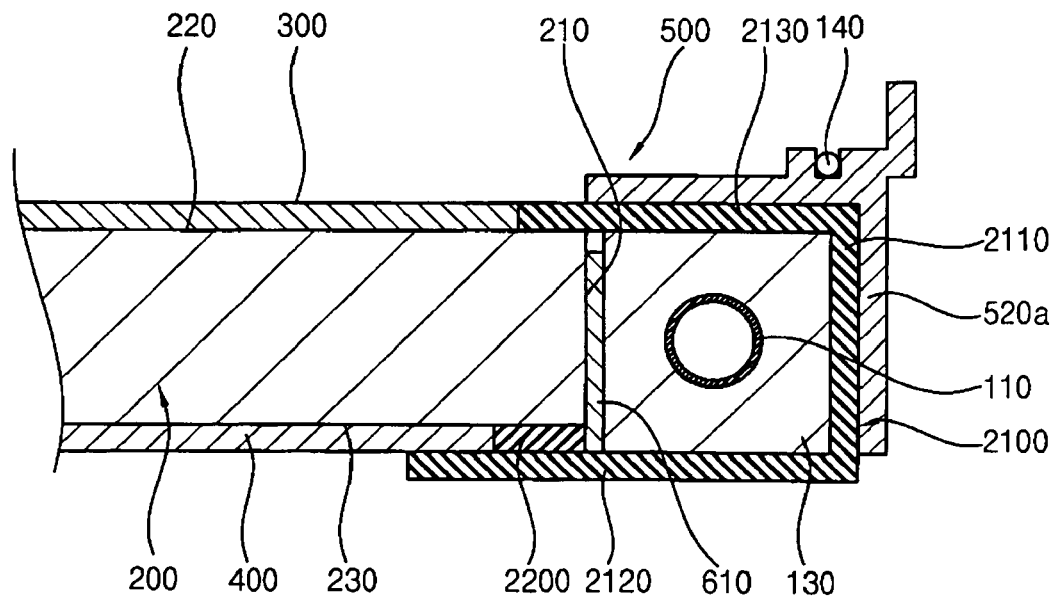
FIG. 16 is a cross-sectional view showing an adhesive member in FIG. 14 in another exemplary embodiment of a backlight assembly according to the present invention.

FIG. 16 is a cross-sectional view showing another exemplary embodiment of an adhesive member in FIG. 14 according to the present invention.

Referring to FIGS. 14 and 16, the lamp cover 2100 includes a first portion 2110 facing the incident face 210 of the light guide plate 200, a second portion 2120 extended from a first end of the first portion 2110, and a third portion 2130 extended from a second end of the first portion 2110 and facing the second portion 2120. The second portion 2120 may be generally parallel with the third portion 2130.

An end of the second portion 2120 is partially overlapped with and makes contact with the guide face 230 (rear face) of the light guide plate 200, and an end of the third portion 2130 is partially overlapped with and makes contact with the light exiting face 220 (upper face) of the light guide plate 200.

The first fixing member 610 is disposed between the lamp 110 and the incident face 210 of the light guide plate 200. The first fixing member 610 prevents the light guide plate 200 from moving towards the lamp 110.

The reflecting sheet 400 and the adhesive member 2200 are disposed under the guide face 230 of the light guide plate 200. In the illustrated embodiment, the adhesive member 2200 is disposed at an end of the guide face 230 adjacent to the lamp unit 100. The adhesive member 2200 is disposed between the second portion 2120 of the lamp cover 2100 and the guide face 230. Thus, the adhesive member 2200 adheres the light guide plate 200 to the lamp cover 2100.

The reflecting sheet 400 is not overlapped with the adhesive member 2200. That is, the reflecting sheet 400 is disposed adjacent the guide face 230 of the light guide plate 200 but not within an area on which the adhesive member 2200 is disposed.

Figure 17:
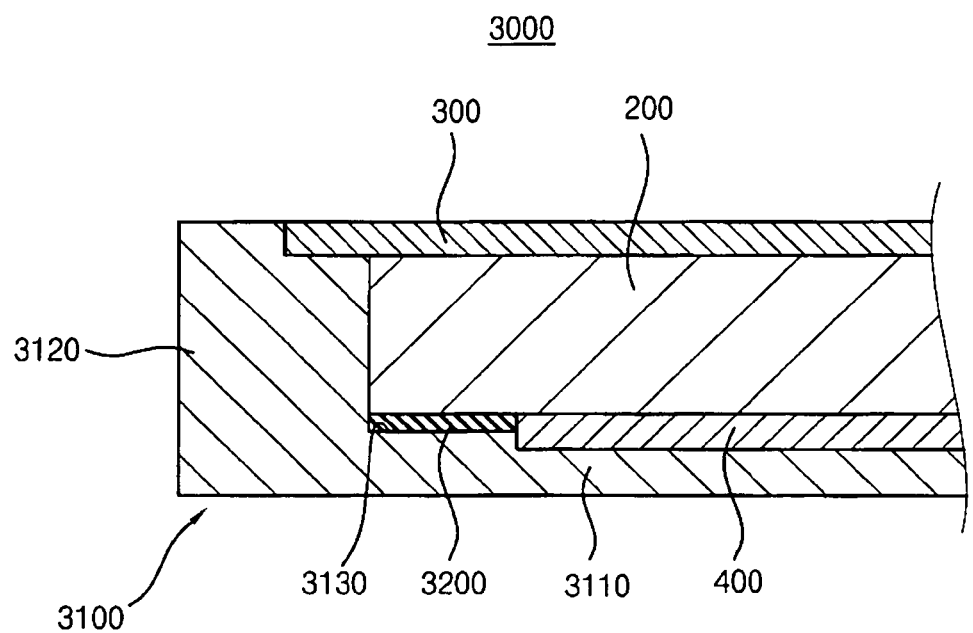
FIG. 17 is a cross-sectional view showing another exemplary embodiment of a backlight assembly according to the present invention.

FIG. 17 is a cross-sectional view showing another exemplary embodiment of a backlight assembly according to the present invention.

Referring to FIG. 17, a backlight assembly 3000 has a same function and structure as the backlight assembly 2000 shown in FIG. 14 except for a receiving container 3100 and an adhesive member 3200. Thus, in FIG. 17, the same reference numerals denote the same elements in FIG. 14, and thus any further repetitive descriptions of the same elements will be omitted.

The backlight assembly 3000 includes a lamp unit (not shown) that generates a light, a light guide plate 200 that guides the light, an optical sheet 300 that improves light characteristics such as brightness, uniformity or the like of the light exiting from the light exiting face of the light guide plate 200, a reflecting sheet 400 disposed under the guide face of the light guide plate 200 to reflect light that leaks from the light guide plate 200, a receiving container 3100, and an adhesive member 3200 that adheres the light guide plate 200 to the receiving container 3100.

The receiving container 3100 receives the lamp unit, the light guide plate 200, the optical sheet 300, and the reflecting sheet 400. The receiving container 3100 includes a bottom 3110 and a sidewall 3120 extended from the bottom 3110 to provide a receiving space. The reflecting sheet 400 and the adhesive member 3200 are disposed on the bottom 3110. A first area 3130 of the bottom 3110 on which the adhesive member 3200 is disposed is protruded by a predetermined height. That is, a stepped portion is formed on the bottom 3110 between the first area 3130 and a second area of the bottom 3110 on which the reflecting sheet 400 is provided. The adhesive member 3200 and the reflecting sheet 400 are disposed on the first and second areas, respectively. Thus, as illustrated, a thickness of the adhesive member 3200 may be less than a thickness of the reflecting sheet 400.

The adhesive member 3200 is a double-sided adhesive tape and is adhered to the guide face of the light guide plate 200 and the first area 3130 of the bottom 3110 of the receiving container 3100. In the illustrated embodiment, the adhesive member 3200 is disposed at a second side of the light guide plate 200 opposite to a first side of the receiving container 3100, which is adjacent to the lamp unit. Additionally or alternatively, the adhesive member 3200 may be disposed at the first side, the second side, or sides between the first and second sides of the light guide plate 200 according to an assemblability of the backlight assembly 3000 and a shape of the receiving container 3100.

The adhesive member 3200 is disposed between the bottom 3110 and the light guide plate 200 so as to adhere the light guide plate 200 to the receiving container 3100. The adhesive member 3200 may be separated from the light guide plate 200 or the receiving container 3100 since the adhesive member 3200 has a thickness thinner than a thickness of the reflecting sheet 400. However, the adhesive member 3200 may be pressurized to the light guide plate 200 by means of the first area 3130 on which the adhesive member 3200 is disposed, so that the adhesive member 3200 may be adhered to the light guide plate 200 or the receiving container 3100. In one embodiment, an initial thickness of the adhesive member 3200 may be reduced after the light guide plate 200 is placed on the bottom 3110.

That is, the first area 3130 of the bottom 3110 is protruded from an upper surface of the bottom 3110 by a thickness difference between the adhesive member 3200 and the reflecting sheet 400. The adhesive member 3200 is disposed between the light guide plate 200 and the first area 3130 of the bottom 3110 of the receiving container 3100. Thus, the adhesive member 3200 may be adhered to the light guide plate 200 and the receiving container 3100, thereby adhering the light guide plate 200 to the receiving container 3100. The backlight assembly 3000 may fix the light guide plate 200 to the receiving container 3100 without reforming the light guide plate 200, so that the backlight assembly 3000 may supply light having uniform brightness.

Although not shown in FIG. 17, the backlight assembly 3000 may also include a first fixing member and a second fixing member to fix the light guide plate 200 to the receiving container 3100 such that the light guide plate 200 does not move towards the lamp unit.

Figure 18:
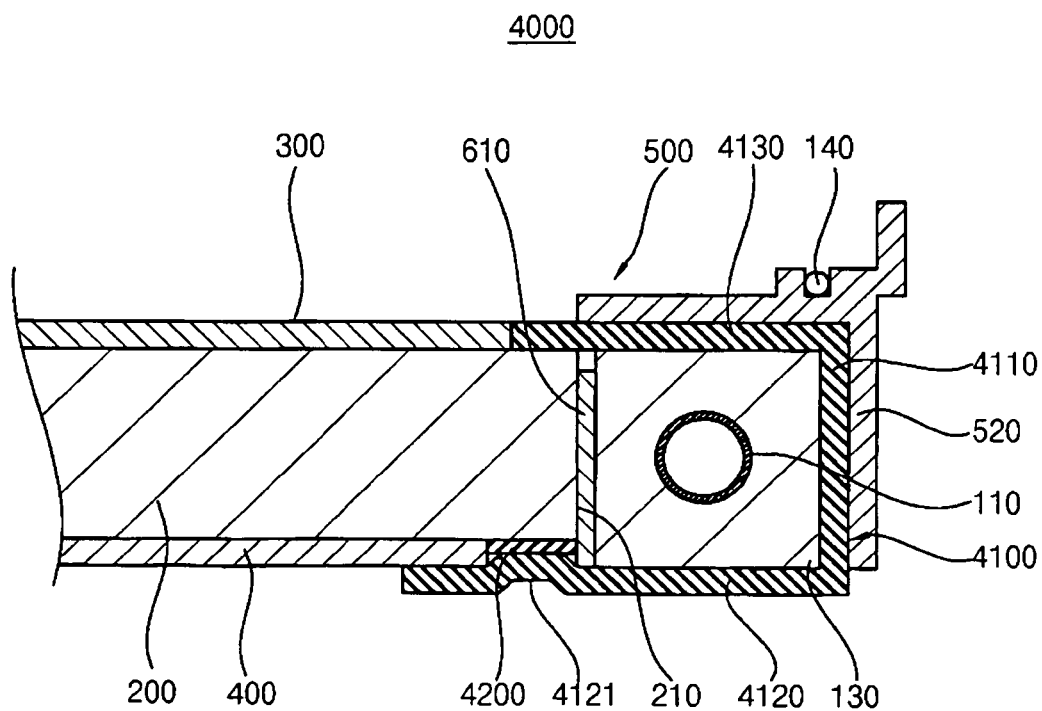
FIG. 18 is a cross-sectional view showing another exemplary embodiment of a backlight assembly according to the present invention.

FIG. 18 is a cross-sectional view showing another exemplary embodiment of a backlight assembly according to the present invention.

Referring to FIG. 18, a backlight assembly 4000 has a same function and structure as the backlight assembly 2000 shown in FIG. 14 except for a lamp cover 4100 and an adhesive member 4200. Therefore, in FIG. 18, the same reference numerals denote the same elements in FIG. 14, and thus any further repetitive descriptions of the same elements will be omitted.

The backlight assembly 4000 includes a lamp 110 that generates a light, a lamp cover 4100 that receives the lamp 110, a light guide plate 200 that guides the light from the lamp 110, an optical sheet 300 disposed on a light exiting face of the light guide plate 200, a reflecting sheet 400 disposed under a guide face of the light guide plate 200, a receiving container 500, a first fixing member 610, a second fixing member (not shown), and an adhesive member 4200 that adheres the light guide plate 200 to the lamp cover 4100.

The lamp cover 4100 includes a first portion 4110 facing an incident face 210 of the light guide plate 200, a second portion 4120 extended from a first end of the first portion 4110, and a third portion 4130 extended from a second end of the first portion 4110 and facing the second portion 4120. The second portion 4120 may be generally parallel to the third portion 4130.

The second portion 4120 makes contact with a rear face (guide face) of the light guide plate 200, and the third portion 4130 makes contact with a front face (light exiting face) of the light guide plate 200. A portion of the second portion 4120 corresponding to the adhesive member 4200 is bent toward the light guide plate 200 to form a projecting portion 4121. The projecting portion 4121 may extend the full longitudinal length of the second portion 4120. Alternatively, a plurality of projecting portions 4121 may be dispersed along the longitudinal length of the second portion 4120.

The adhesive member 4200 is formed on the rear face of the light guide plate 200. In this embodiment, the adhesive member 4200 is formed on an end of the rear face of the light guide plate 200 adjacent to the lamp 110. The adhesive member 4200 is a double-sided adhesive tape and is adhered to the light guide plate 200 and the lamp cover 4100 to fix the light guide plate 200 to the lamp cover 4100. While a double-sided adhesive tape is disclosed as the adhesive member 4200, other adhesive members that secure the light guide plate 200 to the lamp cover 4100 would also be within the scope of these embodiments.

In this embodiment, the adhesive member 4200 has a thickness thinner than that of the reflecting sheet 400, so that the adhesive member 4200 may be separated from the lamp cover 4100 or the light guide plate 200. The projecting portion 4121 of the lamp cover 4100 may pressurize the adhesive member 4200 toward the light guide plate 200, thereby preventing the inadvertent separation of the adhesive member 4200 from the light guide plate 200 or the lamp cover 4100.

That is, the projecting portion 4121 is projected by a thickness difference between the adhesive member 4200 and the reflecting sheet 400, and the adhesive member 4200 is disposed between the light guide plate 200 and the projecting portion 4121. Thus, the adhesive member 4200 may be adhered to the light guide plate 200 and the lamp cover 4100 such that the light guide plate 200 is fixed to the lamp cover 4100. Therefore, the backlight assembly 4000 may fix the light guide plate 200 to the lamp cover 4100 without reforming the light guide plate 200, so that the backlight assembly 4000 may supply light having uniform brightness.

Figure 19:
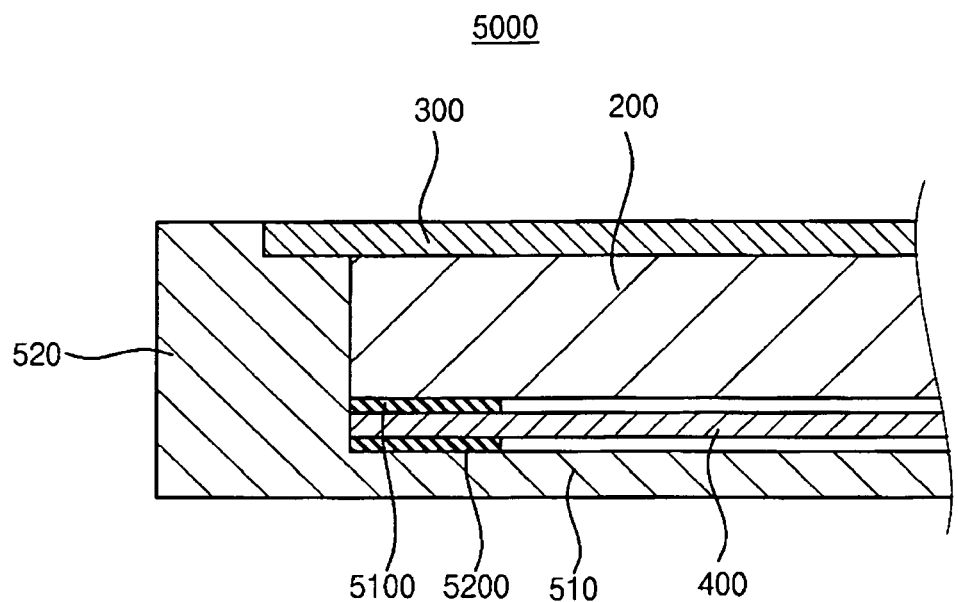
FIG. 19 is a cross-sectional view showing another exemplary embodiment of a backlight assembly according to the present invention.

FIG. 19 is a cross-sectional view showing another exemplary embodiment of a backlight assembly according to the present invention.

Referring to FIG. 19, a backlight assembly 5000 has a same function and structure as the backlight assembly 2000 shown in FIG. 14 except for first and second adhesive members 5100 and 5200. Thus, in FIG. 19, the same reference numerals denote the same elements in FIG. 14, and thus any further repetitive descriptions of the same elements will be omitted.

The backlight assembly 5000 includes a lamp unit (not shown) that generates a light, a light guide plate 200 that guides the light from the lamp unit, an optical sheet 300 disposed on a light exiting or upper face of the light guide plate 200, a reflecting sheet 400 disposed under a guide or rear face of the light guide plate 200, a receiving container 500, first and second fixing members (not shown) that support an incident face 210 of the light guide plate 200 to prevent movement of the light guide plate 200 towards the lamp unit, and first and second adhesive members 5100 and 5200 that adhere the light guide plate 200 to the receiving container 500.

The reflecting sheet 400 and the light guide plate 200 are sequentially disposed on a bottom 510 of the receiving container 500.

Each of the first and second adhesive members 5100 and 5200 is a double-sided tape and is formed under the light guide plate 200. While a double-sided adhesive tape is disclosed as the adhesive members 5100, 5200, other adhesive members that secure the light guide plate 200 to the bottom 510 would also be within the scope of these embodiments. The first and second adhesive members 5100 and 5200 are disposed at a second end of a rear face of the light guide plate 200, which is opposite to a first end (incident face) of the light guide plate 200 adjacent to the lamp unit.

The first adhesive member 5100 is disposed between an upper surface of the reflecting sheet 400 and a rear surface of the light guide plate 200 so as to adhere the reflecting sheet 400 to the light guide plate 200. The second adhesive member 5200 is disposed between a rear surface of the reflecting sheet 400 and an upper surface of the bottom 510 of the receiving container 500 so as to fix the reflecting sheet 400 to the bottom 510 of the receiving container 500. Thus, the backlight assembly 5000 may fix the light guide plate 200 to the receiving container 500 without reforming the light guide plate 200, so that the backlight assembly 5000 may supply light having uniform brightness. Also in this embodiment, the adhesive members 5100 and 5200 may have a thickness greater than or less than a thickness of the reflecting sheet 400, and the adhesive members 5100 and 5200 need not have the same thickness. Thus, the adhesive factors between the light guide plate 200, the reflecting sheet 400, and the bottom 510 may be altered as necessary or desired.

Figure 20:
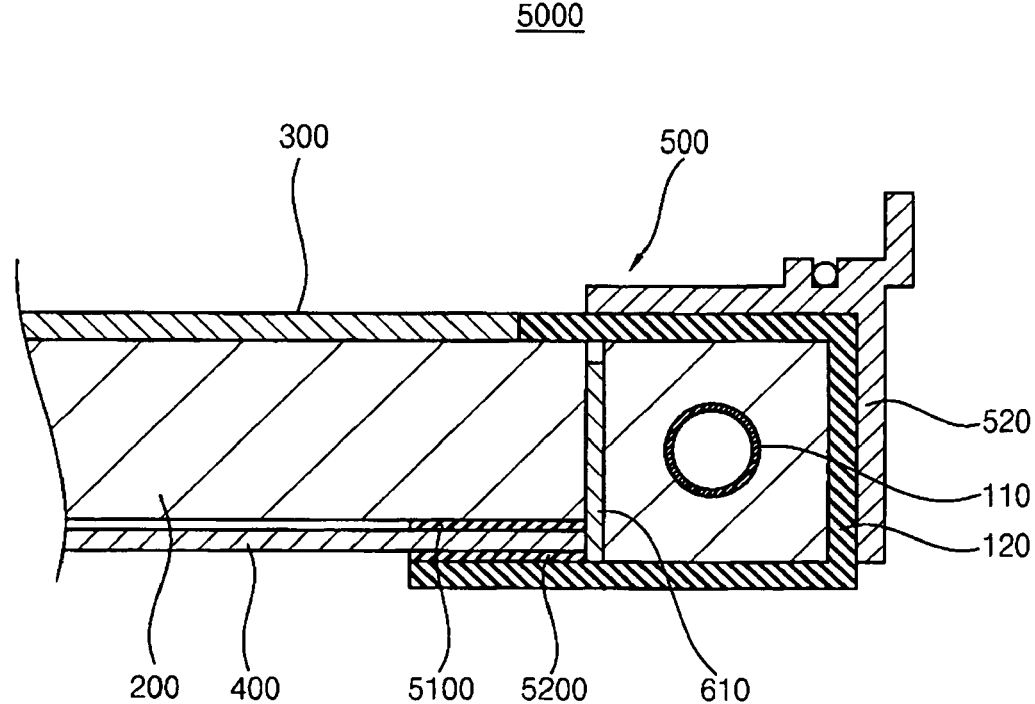
FIG. 20 is a cross-sectional view showing another exemplary embodiment of a backlight assembly according to the present invention.

FIG. 20 is a cross-sectional view showing another exemplary embodiment of a backlight assembly according to the present invention.

Referring to FIG. 20, a backlight assembly 5000 has a same function and structure as the backlight assembly 5000 shown in FIG. 19 except for positions of the first and second adhesive members 5100 and 5200. Therefore, in FIG. 20, the same reference numerals denote the same elements in FIG. 19, and thus any further repetitive descriptions of the same elements will be omitted.

The lamp 110 is received in the lamp cover 120, and the lamp cover 120 is disposed adjacent to the incident face 210 of the light guide plate 200. The first fixing member 610 is disposed between the lamp holder 130 and the incident face 210 of the light guide plate 200, so that the first fixing member 610 may prevent movement of the light guide plate 200 towards the lamp 110.

Each of the first and second adhesive members 5100 and 5200 is a double-sided tape formed under the light guide plate 200. Contrary to the positioning of the first and second adhesive members 5100, 5200 in FIG. 19, the first and second adhesive members 5100 and 5200 in FIG. 20 are disposed at the first end of a rear face of the light guide plate 200, which is opposite to the second end of the light guide plate 200.

More particularly, the first adhesive member 5100 is disposed between an upper surface of the reflecting sheet 400 and the rear surface of the light guide plate 200 so as to adhere the reflecting sheet 400 to the light guide plate 200. The second adhesive member 5200 is disposed between the rear surface of the reflecting sheet 400 and an inner surface of the lamp cover 120 so as to fix the reflecting sheet 400 to the lamp cover 120. Thus, the backlight assembly 5000 may fix the light guide plate 200 to the receiving container 500 without reforming the light guide plate 200, so that the backlight assembly 5000 may supply light having uniform brightness. In yet another embodiment, the first and second adhesive members 5100, 5200 may be positioned at both locations shown in FIGS. 19 and 20.

FIG. 21 is an exploded perspective view showing an exemplary embodiment of an LCD apparatus according to the present invention. In FIG. 21, a backlight assembly 7000 has a same function and structure as any of backlight assemblies 1000, 2000, 3000, 4000 and 5000 shown in FIGS. 1 to 20, and thus any further repetitive descriptions of the same elements will be omitted.

Referring to FIG. 21, an LCD apparatus includes a display panel assembly 6000 that displays an image using a light, a backlight assembly 7000 that emits light for use by the display panel assembly 6000, a guide pad 8000 that supports the display panel assembly 6000 and prevents light leakage from the display panel assembly 6000, and a top chassis 9000 that guides the display panel assembly 6000 into place upon the receiving container 500.

The display panel assembly 6000 includes an LCD panel 6100 that displays the image corresponding to an image signal using the light from the backlight assembly 7000, data and gate printed circuit boards ("PCBs") 6200 that generate a driving signal corresponding to the image signal, a data tape carrier package ("TCP") 6300 and a gate TCP 6400.

The LCD panel 6100 includes a thin film transistor ("TFT") substrate 6110, a color filter substrate 6120 facing the TFT substrate 6110 and coupled to the TFT substrate 6110, and a liquid crystal layer (not shown) between the TFT substrate 6110 and the color filter substrate 6120.

The TFT substrate 6110 includes a plurality of pixels (not shown). Each of the pixels is defined by a gate line (not shown) and a data line (not shown) substantially perpendicular to the gate line. Each of the pixels includes a TFT acting as a switching device and a pixel electrode.

The color filter substrate 6120 includes red, green, and blue ("RGB") pixels (not shown) formed by a thin film process and also includes a common electrode.

The liquid crystal layer is disposed between the TFT substrate 6110 and the color filter substrate 6120. When an electric field is generated between the pixel electrode of the TFT substrate 6110 and the common electrode of the color filter substrate 6120, an aligning angle of the liquid crystal molecules of the liquid crystal layer is changed, so that a light transmittance of the liquid crystal layer is varied in accordance with the change of the aligning angle of the liquid crystal layer, so a desired image may be obtained.

The PCB 6200 is attached to a source side of the LCD panel 6100. The PCB 6200 includes a driving chip that generates the driving signal, a timing controller that adjusts a timing of the driving signal, and a memory that memorizes a data signal and a gate signal.

The data TCP 6300 is attached to an end of the PCB 6200. The data TCP 6300 is electrically connected to the LCD panel 6100 and the PCB 6200 so as to apply the driving signal and the data signal from the PCB 6200 to the LCD panel 6100.

The gate TCP 6400 is attached to a gate side of the LCD panel 6100. The gate TCP 6400 applies the gate signal and the driving signal from the PCB 6200 to the LCD panel 6100.

The backlight assembly 7000 is disposed under the display panel assembly 6000 to uniformly apply light to the LCD panel 6100.

The guide pad 8000 includes a rubber material, or an alternative other suitable material, and is disposed between the LCD panel 6100 and the backlight assembly 7000. The guide pad 8000 is attached to the backlight assembly 7000 to support an end of the LCD panel 6100, so that the LCD panel 6100 may be maintained in a substantially horizontal state relative to the upper light exiting face of the light guide plate 200.

The top chassis 9000 is disposed on the LCD panel 6100. The top chassis 9000 is coupled to the receiving container 500 of the backlight assembly 7000, thereby fixing the LCD panel 6100 to the receiving container 500.

Figure 22:
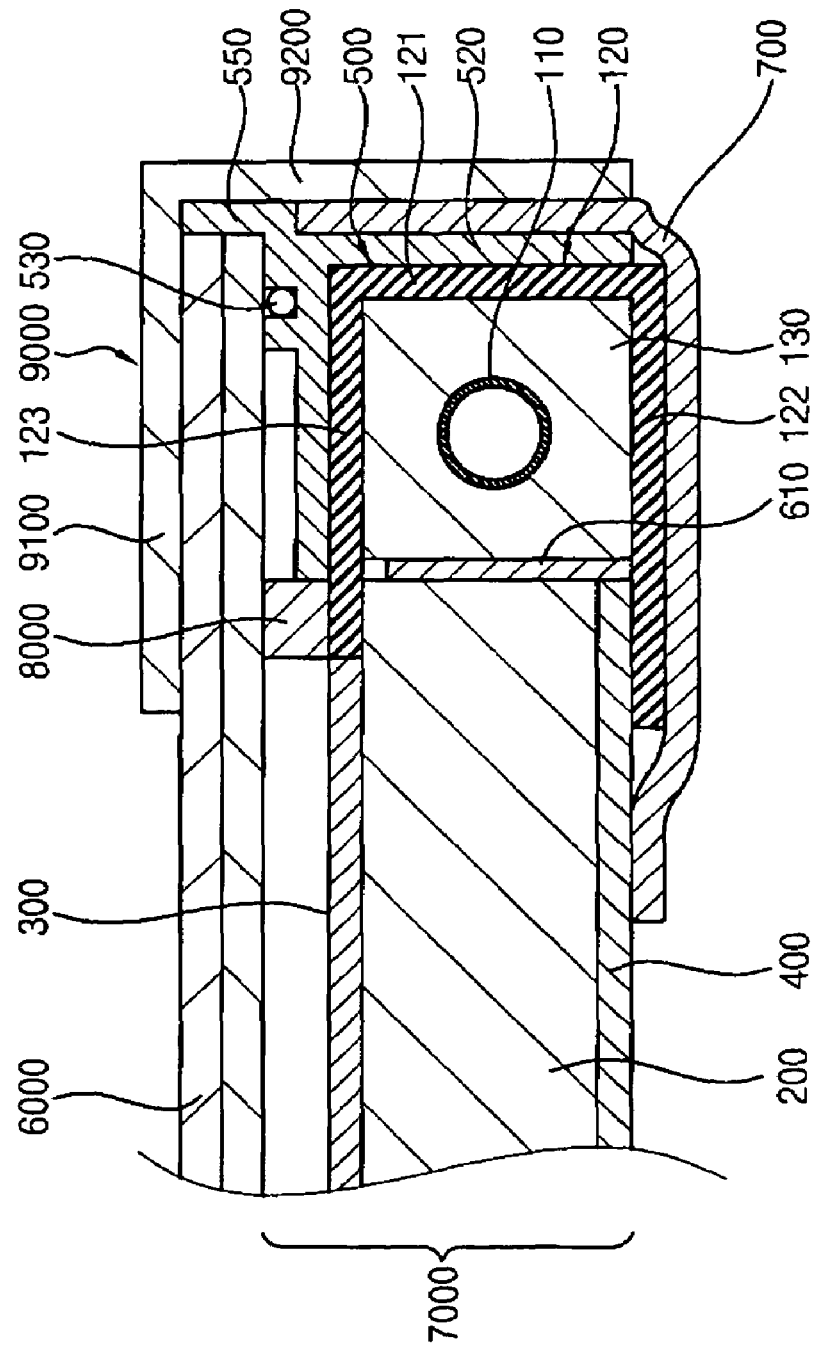
FIG. 22 is a cross-sectional view taken along line IV-IV' of FIG. 21 showing the liquid crystal display apparatus in FIG. 21.

FIG. 22 is a cross-sectional view taken along line IV-IV' showing the LCD apparatus in FIG. 21.

Referring to FIG. 22, the reflecting sheet 400 and the light guide plate 200 having the first prism pattern are sequentially received in the receiving container 500. The lamp 110 received in the lamp cover 120 is disposed between the sidewall 520 of the receiving container 500 and the light guide plate 200. The sidewall 520 of the receiving container 500 in which the lamp cover 120 is received covers the first and third portions 121 and 123 of the lamp cover 120.

The first fixing member 610 is disposed between an incident face 210 of the light guide plate 200 and the first lamp holder 130 holding the lamp 110, thereby preventing movement of the light guide plate 200 towards the lamp 110. Thus, the backlight assembly 7000 may fix the light guide plate 200 to the receiving container 500 without reforming the light guide plate 200, so that the backlight assembly 7000 may supply light having uniform brightness to the LCD panel 6100.

Although not shown in FIG. 22, the backlight assembly 7000 may further include at least one adhesive member to fix the light guide plate 200 to the receiving container 500. The adhesive member may be formed on the rear face of the light guide plate 200 to fix the light guide plate 200 to the receiving container 500 or the lamp cover 120. On the other hand, the backlight assembly 7000 may include two or more adhesive members in order to adhere the reflecting sheet 400 to the receiving container 500 or the lamp cover 120 after adhering the reflecting sheet 400 to the light guide plate 200.

The LCD panel 6100 is disposed on the upper face of the sidewall 520 of the receiving container 500. The guide portion 550 formed on the sidewall 520 of the receiving container 500 guides the LCD panel 6100.

Since the sidewall 520 of the receiving container 500 partially covers the third portion 123 of the lamp cover 120, the end of the third portion 123 adjacent to the light guide plate 200 is exposed. Also, the upper face of the sidewall of the receiving container 500 may be non-uniform because of the receiving groove 530 into which the wire 140, 145 is received. That is, an interval between the light guide plate 200 and the LCD panel 6100 is irregular.

The guide pad 8000 is disposed between the exposed end of the third portion 123 of the lamp cover 120 not covered by the sidewall 520 and the LCD panel 6100 so as to allow the LCD panel 6100 to be maintained in the horizontal state relative to the light guide plate 200, thereby preventing the light leakage from the light guide plate 200. Furthermore, the upper light exiting surface of the light guide plate 200 is maintained in a horizontal state relative to the LCD panel 6100 by the fixing members and/or adhesive members. By maintaining both the LCD panel 6100 and the upper light exiting face of the light guide plate 200 in a horizontal state relative to each other, the LCD panel 6100 and the upper light exiting face light guide plate 200 are maintained substantially parallel to each other, thus ensuring a maximum output of light from the light guide plate 200 to the LCD panel 6100.

The top chassis 9000 includes an upper portion 9100 and a side portion 9200 extended downwardly from the upper portion 9100. The upper portion 9100 covers an end periphery of the LCD panel 6100 and the side portion 9200 guides the LCD panel 6100 to remain in place upon the receiving container 500.

According to the above, the backlight assembly includes the first and second fixing members that hold the incident face of the light guide plate, thereby preventing movement of the light guide plate towards the lamp. Thus, the backlight assembly may fix the light guide plate to the receiving container without reforming the light guide plate, so that the backlight assembly may supply light having uniform brightness to the LCD panel and improve the display characteristics.

Further, the backlight assembly includes the adhesive member between the light guide plate and the receiving container or the lamp cover, thereby firmly fixing the light guide plate to the receiving container.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A backlight assembly comprising:

a light supplying part generating a light;

a light guide plate guiding the light from the light supplying part;

a receiving container receiving the light supplying part and the light guide plate; the receiving container comprising:

a bottom, the light guide plate disposed on the bottom; and a sidewall extended from the bottom and providing a receiving space receiving the light guide plate; and a fixing member coupled to the receiving container such that a portion of the fixing member is disposed between the light supplying part and the light guide plate, and fixing the light guide plate to the receiving container, the fixing member comprising:

a body;

a first supporter extended from a first end of the body and into the receiving space, the first supporter preventing a movement of the light guide plate towards the light supplying part; and a second supporter extending from a second end of the body and facing the first supporter, the second supporter coupled to the receiving container and inserted into an insertion recess formed at the sidewall of the receiving container.

2. The backlight assembly of claim 1, wherein the light guide plate comprises:

an incident face into which the light from the light supplying part is incident;

an exiting face from which the light incident into the light guide plate exits, the exiting face extending from a first end of the incident face; and a guide face changing a path of the incident light and applying the incident light to the exiting face, the guide face extending from a second end of the incident face and facing the exiting face.

3. The backlight assembly of claim 2, wherein the first supporter is adjacent to at least one corner of the incident face of the light guide plate.

4. The backlight assembly of claim 1, wherein the receiving container comprises an engaging recess formed at the sidewall thereof and coupled to the fixing member, and the body of the fixing member comprising a coupling hole corresponding to the engaging recess.

5. The backlight assembly of claim 4, wherein the light supplying part comprises:

a lamp generating the light in response to a power voltage;

a lamp holder holding the lamp, the lamp holder coupled to an end of the lamp; and a lamp cover receiving the lamp and reflecting the light from the lamp to the light guide plate.

6. The backlight assembly of claim 5, wherein the first supporter is disposed between the light guide plate and the lamp holder.

7. The backlight assembly of claim 5, wherein the lamp cover comprises an engaging hole, and the lamp cover and the fixing member coupled to the receiving container by a screw screwed into the engaging recess after passing through the engaging hole and the coupling hole.

8. The backlight assembly of claim 5, wherein the light supplying part further comprises a wire electrically connected to the end of the lamp and applying the power voltage to the lamp, and the receiving container further comprising a receiving groove formed on the sidewall adjacent to the light supplying part.

9. The backlight assembly of claim 8, wherein the receiving container further comprises a fixing hole formed through the sidewall thereof and holding the wire.

10. The backlight assembly of claim 1, wherein the first supporter is positioned in a non-light emitting area of the light supplying part.

11. The backlight assembly of claim 1, wherein the fixing member comprises a metal material.

12. The backlight assembly of claim 1, further comprising a reflecting sheet between the light guide plate and the receiving container, the reflecting sheet reflecting the light through a rear face of the light guide plate.

13. The backlight assembly of claim 12, further comprising a first adhesive member attached to the rear face of the light guide plate, the adhesive member holding the light guide plate.

14. The backlight assembly of claim 13, wherein the reflecting sheet is disposed within a first area of the receiving container, and is not disposed within a second area of the receiving container, the first adhesive member disposed within the second area of the receiving container, and the first adhesive member disposed between the rear face of the light guide plate and a bottom of the receiving container.

15. The backlight assembly of claim 14, wherein the bottom of the receiving container comprises a projecting portion projected toward the light guide plate, and the projecting portion corresponds to the first adhesive member.

16. The backlight assembly of claim 13, further comprising a second adhesive member attached to a rear face of the reflecting sheet, the second adhesive member holding the reflecting sheet relative to the receiving container, and the first adhesive member disposed between the rear face of the light guide plate and the reflecting sheet.

17. The backlight assembly of claim 16, wherein each of the first and second adhesive members comprises a double-sided tape.

18. The backlight assembly of claim 1, wherein the light guide plate comprises a prism pattern formed on a face of the light guide plate, the prism pattern changing a path of the light from the light supplying part, and the prism pattern extending in a substantially perpendicular direction to a longitudinal direction of the light supplying part.

19. The backlight assembly of claim 18, wherein the prism is a first prism pattern, the backlight assembly further comprising an optical sheet disposed on a light exiting face of the light guide plate, the optical sheet including a second prism pattern extending in a substantially perpendicular direction to the first prism pattern.

20. The backlight assembly of claim 1, further comprising an optical sheet disposed on a light exiting face of the light guide plate, the optical sheet having a hole, the receiving container having a protrusion inserted in the hole of the optical sheet and trapping the light guide plate between the receiving container and the optical sheet.

21. The backlight assembly of claim 1, wherein the fixing member is a first fixing member disposed adjacent a first end of the light supplying part, the backlight assembly further comprising a second fixing member disposed adjacent a second end of the light supplying part.

22. The backlight assembly of claim 1, wherein the fixing member is inserted into the backlight assembly from a rear surface of the receiving container and the light guide plate is received into the receiving container from a front surface of the receiving container.

23. The backlight assembly of claim 1, wherein the fixing member is non-adhesive.

24. The backlight assembly of claim 23, further comprising an adhesive member for adhering the light guide plate relative to the receiving container.

25. A backlight assembly comprising:

a light supplying part generating a light;

a light guide plate guiding the light from the light supplying part;

a receiving container receiving the light supplying part and the light guide plate, the receiving container comprising:

a bottom, the light guide plate disposed on the bottom; and a sidewall extended substantially perpendicular from edges of the bottom and providing a receiving space receiving the light guide plate, the sidewall including an engaging recess;

a fixing member coupled to the receiving container, the fixing member fixing the light guide plate to the receiving container, the fixing member comprising:

a body portion including a coupling hole corresponding to the engaging recess of the receiving container;

a supporting portion extending from a first end of the body portion, the first supporting portion supporting the light guide plate; and a screw passing through the coupling hole of the body portion and the engaging recess of the receiving container to engage the fixing member with the receiving container.

26. A display apparatus comprising:

a display panel receiving a light and displaying an image using the light; and a backlight assembly comprising:

a light supplying part generating a light;

a light guide plate guiding the light from the light supplying part;

a receiving container receiving the light supplying part and the light guide plate; and a fixing member coupled to the receiving container such that a portion of the fixing member is disposed between the light supplying part and the light guide plate, the fixing member fixing the light guide plate to the receiving container, wherein the receiving container comprises:

a bottom, the light guide plate disposed on the bottom; and a sidewall extending from the bottom and providing a receiving space receiving the light guide plate, the sidewall having an insertion recess combined with the fixing member; and wherein the fixing member comprises:

a body;

a first supporter extending from a first end of the body toward the receiving space, the first support preventing a movement of the light guide plate toward the light supplying part; and a second supporter extending from a second end of the body and inserted into the insertion recess in the sidewall of the receiving container, the second supporter facing the first supporter.

27. The display apparatus of claim 26, wherein an end of the first supporter is overlapped with an incident face of the light guide plate, the light from the light supplying part incident into the incident face.

28. The display apparatus of claim 26, wherein the receiving container comprises openings formed through the bottom, and the bottom has a gradually decreasing thickness from a central portion of ribs between the openings to edge portions of the ribs between the openings, the gradually decreasing thickness preventing a deformation of a prism pattern on a rear surface of the light guide plate.

29. The display apparatus of claim 26, wherein the receiving container receives the display panel thereon, and the receiving container comprises at least one guide portion formed on at least one corner thereof, the at least one guide portion guiding the display panel into a receiving position.

30. A display apparatus comprising:

a display panel receiving a light and displaying an image using the light; and a backlight assembly comprising:

a light supplying part generating a light, the light supplying part including a lamp cover including an engaging hole;

a light guide plate guiding the light from the light supplying part;

a receiving container receiving the light supplying part and the light guide plate, the receiving container comprising:

a bottom, the light guide plate disposed on the bottom; and a sidewall extended substantially perpendicular from edges of the bottom and providing a receiving space receiving the light guide plate, the sidewall including an engaging recess; and a fixing member coupled to the receiving container, the fixing member fixing the light guide plate to the receiving container, the fixing member comprising:

a body portion including a coupling hole corresponding to the engaging recess of the receiving container; and a supporting portion extending from a first end of the body portion, the first supporting portion supporting the light guide plate;

wherein the engaging hole of the lamp cover, the engaging recess of the receiving container and the coupling hole of the fixing member are arranged in a row to be connected to each other.

31. The display apparatus of claim 30, wherein the light guide plate includes a prism pattern formed on a rear face of the light guide plate, the prism pattern extending in a substantially perpendicular direction to a longitudinal direction of the light supplying part.

32. The display apparatus of claim 30, wherein the light supplying part further includes:

a lamp generating the light in response to a power voltage, wherein the lamp cover receives the lamp and reflects the light from the lamp to the light guide plate, and wherein an upper face of the lamp cover supports an edge of the display panel.

33. The display apparatus of claim 32, further comprising a guide pad disposed between the lamp cover and the display panel, the guide pad maintaining the display panel in a horizontal state relative to the light guide plate.

34. The display apparatus of claim 33, wherein the guide pad comprises a rubber material.

35. A display apparatus comprising:

a display panel to receiving a light and displaying an image using the light; and a backlight assembly comprising:

a light supplying part generating a light;

a light guide plate guiding the light from the light supplying part and supplying the light to the display panel;

a reflecting sheet under the light guide plate, the reflecting sheet reflecting light from the light guide plate;

a receiving container receiving the light guide plate and the reflecting sheet;

a fixing member coupled to the receiving container such that a portion of the fixing member is disposed between the light supplying part and the light guide plate, the fixing member fixing the light guide plate to the receiving container; and an adhesive member attached to a rear face of the light guide plate, the adhesive member holding the light guide plate, wherein the adhesive member is disposed between the light guide plate and a bottom of the receiving container and formed at a second end opposite to a first end of the light guide plate, the first end of the light guide plate adjacent to the light supplying part.

36. The display apparatus of claim 35, wherein the backlight assembly further comprises a lamp cover inside the receiving container, the lamp cover receiving a lamp and reflecting light from the lamp to the light guide plate, and the adhesive member disposed between the light guide plate and the lamp cover, the adhesive member fixing the light guide plate to the lamp cover.

37. The display apparatus of claim 35, wherein the light guide plate comprises a prism pattern on a face of the light guide plate, the prism pattern changing a path of the light from the light supplying part, the prism pattern extended in a substantially perpendicular direction to a longitudinal direction of the light supplying part.

38. A display apparatus comprising:
a display panel receiving a light and displaying an image using the light; and
a backlight assembly comprising:
a light supplying part generating a light;
a light guide plate guiding the light from the light supplying part and supplying the light to the display panel;
a reflecting sheet disposed under the light guide plate, the reflecting sheet reflecting light from the light guide plate;
a receiving container receiving the light supplying part, the light guide plate, and the reflecting sheet;
a fixing member coupled to the receiving container such that a portion of the fixing member is disposed between the light supplying part and the light guide plate, the fixing member fixing the light guide plate to the receiving container; and
an adhesive member disposed between the light guide plate and a bottom of the receiving container, the adhesive member fixing the light guide plate to the receiving container,
wherein a portion of the bottom of the receiving container corresponding to the adhesive member is upwardly protruded to maintain the light guide plate in a horizontal state relative to the display panel.

39. The display apparatus of claim 38, wherein the reflecting sheet is disposed on an area of the bottom of the receiving container and is not disposed on the upwardly protruded area.

40. The display apparatus of claim 38, wherein the adhesive member is disposed at a second end of the light guide plate, the second end of the light guide plate opposite to a first end of the light guide plate, and the first end is adjacent to the light supplying part.

41. The display apparatus of claim 38, wherein the light guide plate comprises a prism pattern formed on a face of the light guide plate, the prism pattern changing a path of the light from the light supplying part, and the prism pattern extended in a substantially perpendicular direction to a longitudinal direction of the light supplying part.

42. A display apparatus comprising:
a display panel receiving a light and displaying an image using the light; and
a backlight assembly comprising:
a lamp generating a light;
a lamp cover receiving the lamp and reflecting the light from the lamp to the light guide plate;
a light guide plate guiding the light from the lamp and supplying the light to the display panel;
a reflecting sheet disposed under the light guide plate, the reflecting sheet reflecting the light from the light guide plate;
a receiving container receiving the reflecting sheet and the light guide plate;
a fixing member coupled to the receiving container such that a portion of the fixing member is disposed between the lamp and the light guide plate, the fixing member holding the light guide plate; and
an adhesive member disposed between a rear face of the light guide plate and the lamp cover, the adhesive member fixing the light guide plate to the lamp cover,
wherein a portion of the bottom of the lamp cover corresponding to the adhesive member is protruded toward the light guide plate maintaining the light guide plate in a horizontal state relative to the display panel.

43. The display apparatus of claim 42, wherein the light guide plate comprises a prism pattern formed on a face of the light guide plate, the prism patter changing a path of the light from the lamp, the prism pattern extending in a substantially perpendicular direction to a longitudinal direction of the light supplying part.

* * * * *